United States Patent [19]
Leblang et al.

[11] Patent Number: 5,574,898
[45] Date of Patent: Nov. 12, 1996

[54] DYNAMIC SOFTWARE VERSION AUDITOR WHICH MONITORS A PROCESS TO PROVIDE A LIST OF OBJECTS THAT ARE ACCESSED

[75] Inventors: David B. Leblang, Wayland; Larry W. Allen, Cambridge; Robert P. Chase, Jr., Newton; Bryan P. Douros, Framingham; David E. Jabs, Sudbury; Gordon D. McLean, Jr., Brookline; Debra A. Minard, Newton Upper Falls, all of Mass.

[73] Assignee: Atria Software, Inc., Lexington, Mass.

[21] Appl. No.: 1,822

[22] Filed: Jan. 8, 1993

[51] Int. Cl.$^6$ .................................................. G06F 11/34
[52] U.S. Cl. ...................... 395/601; 395/561; 364/221.7; 364/280.6; 364/DIG. 1
[58] Field of Search ..................... 395/600, 650, 395/700, 725, 575, 183.13, 183.14; 371/19

[56] References Cited

U.S. PATENT DOCUMENTS

| | | | |
|---|---|---|---|
| 4,558,413 | 12/1985 | Schmidt et al. | 395/600 |
| 4,809,170 | 2/1989 | Leblang et al. | 364/DIG. 1 |
| 4,912,637 | 3/1990 | Sheedy et al. | 395/600 |
| 4,951,192 | 8/1990 | Chase, Jr. et al. | 364/DIG. 1 |
| 5,005,119 | 4/1991 | Rumbaugh et al. | 395/650 |
| 5,119,493 | 6/1992 | Janis et al. | 395/650 |
| 5,278,979 | 1/1994 | Foster et al. | 395/600 |
| 5,339,435 | 8/1994 | Lubkin et al. | 395/700 |
| 5,386,558 | 1/1995 | Maudlin et al. | 395/600 |

OTHER PUBLICATIONS

Davis, "Software Checking With The Auditor's Aid," IEEE, 1990, pp. 298–303.
Chou, et al, "Versions and Change Notification in an Object Oriented Database System", 25th ACM/IEEE Design Automation Conf. Proc. 1988., pp. 275–281.
Beech, et al, "Generalized Version Contol in an Object–Oriented Database", Proc. 4th International Conf. on Data Engr. 1988 pp. 14–22.
Hsieh, "Generic Computer Aided Software Engineering (CASE) Database Requirements" 1989 IEEE, pp. 422–423.
Hardwick, et al, "Using a Relational Database as an index to a Distributed Object Database in Engineering Design Systems", IEEE, 1998, pp. 4–11.
Mahler et al. (1987) Shape–a software configuration management tool, International Workshop on Software Version and Configuration Control.
Korn et al. (1989) The 3–D File System, USENIX, Summer, pp. 147–156.
Hendricks, (1990) A Filesystem For Software Development, USENIX, Summer, pp. 333–340.

Primary Examiner—Thomas G. Black
Assistant Examiner—Jack M. Choules
Attorney, Agent, or Firm—Testa, Hurwitz & Thibeault, LLP

[57] ABSTRACT

A data processing system and method features an object selector including an auditor for recording, as an audit record, which versions of objects are accessed by a processor during a data processing process. Each derived object is associated with an audit record. A system build process starts the auditor prior to executing commands which produce derived objects, and stops the auditor when those commands are completed. The process also includes any arbitrary sequence of commands. An audit cache memory stores the most recent audit entries made by the auditor while producing an audit record. A linker is also provided for linking a common identifying label to each object version whose identity is recorded as an entry in an audit record associated with the identifying label. An audit record comparator is provided for determining the difference between source object versions used in building two or more derived object versions.

20 Claims, 18 Drawing Sheets

```
% cleartool lshistory util.c
25-May-92.15:45:19     Allison K. Pak (akp.user@neptune)
   create version "util.c@@/main/3" (REL3)
    "special form of username message for root user
    merge in fix to time string bugfix branch"
25-May-92.15:44:05     Derek R. Philips (drp.user@saturn)
   create version "util.c@@/main/rel2_bugfix/1"
    "fix bug: extra NL in time string"
25-May-92.15:43:03     Derek R. Philips (drp.user@saturn)
   create version "util.c@@/main/rel2_bugfix/0"
25-May-92.15:43:03     Derek R. Philips (drp.user@saturn)
   create branch "util.c@@/main/rel2_bugfix"
25-May-92.14:46:21     Allison K. Pak (akp.user@neptune)
   create version "util.c@@/main/2"
    "shorten HOME string"
```

Fig. 8

DYNAMIC SOFTWARE VERSION AUDITOR WHICH MONITORS A PROCESS TO PROVIDE A LIST OF OBJECTS THAT ARE ACCESSED

BACKGROUND OF THE INVENTION

For many years, there was little in the way of automated "configuration management" in relation to computer software development. As the early software "systems" were developed, documentation and control of the "current version" was most often accomplished as a de-facto manual configuration management. A system was built, tested, the components revised and the system rebuilt. Finally, the system was installed and any future changes were made by way of "patches" to the software system.

More recently, Computer-Aided Software Engineering (CASE) environments have become helpful for complex software projects, just as Computer-Aided Design (CAD) systems have become helpful for complex hardware projects. A few well known CASE systems is include: UNIX/PWB,designed to run on AT&Ts UNIX programming environment, includes the SCCS source code control system and the MAKE configuration tool; RCS, a source code control system that also runs on UNIX systems; CMS and MMS, the Digital Equipment Corp. VAX/VMS equivalent to SCCS and MAKE; ALS, the Ada Language System; and Cedar, running on the Xerox PARC Computer Science Laboratory system.

While prior art CASE systems as described above have offered an improvement in the ability to keep track of various configurations of software systems as they are built and modified, the have limitations. One drawback is the lack of "transparency" and "concurrency" to users in the area of configuration management. For instance, the Master program source codes (i.e., the basic or first versions of the programs) are typically maintained in a Master Table and changes by version are maintained in a Versions Table. The various possible versions of a program (or system comprising multiple programs) are not transparently available to users. Thus, to build a given configuration of a system, a System Builder cannot directly access the versions of the programs to be used in the system build. Rather, control must first be given to a Version Maker which then accesses the Master Table to obtain the master program source(s) and then gets and applies the appropriate version changes from the Version Table. The modified program reflecting a designated version is then stored in a holding area. Finally, control is transferred to a System Builder, which get its input from the holding area, from which it "builds" the desired system in a build area. Moreover, unless multiple holding areas and attendant complex procedures for their use are provided, there is a lack of concurrency in that only one version of the system can be built at any one time.

Another shortcoming of prior art CASE systems is the lack of capability to track and report progress on tasks or to monitor and notify of changes in areas critical to others.

SUMMARY OF THE INVENTION

It is the object of the present invention to provide a CASE system providing transparent access to multiple versions, the ability to build different configurations concurrently without interference, and additional monitoring and reporting capabilities not found in known CASE systems.

The present invention features a CASE version-control system that supports versioning of all file system objects: files, directories, and links. Any type of file can be versioned, including executables, bitmaps, and other non-text files. Versions of directories record how the organization of the source base evolves: renaming of source files, creation of new source files, and so on.

The present invention also features Rule-Based Version Selection in which users can create and use any number of views, each of which selects a particular configuration of source versions. Views are defined by configuration specs consisting of a few powerful, general rules. Thus, there is no need to specify hundreds or thousands of source versions individually. Views are dynamic, updated by reevaluating the rules that define it as needed. Newly-created versions can thus be incorporated into a view automatically and instantly.

The system of the present invention further provides Transparent Access to versions of objects. Each versioned object appears to be an ordinary file or directory. This transparency feature makes the system compatible with common operating systems such as the UNIX open-systems environment. Developers can continue to use their existing tools—shells, editors, compilers, debuggers, and so on—no modifications need be made to such tools.

The present invention also features configuration auditing which automatically produces configuration records, which provide complete "bill-of-materials" documentation of software builds. Each configuration record includes a listing of all source file versions that were used, versions of build tools, and all build options that were specified. Special commands compare configuration records, showing the differences between two builds of the same program. Other commands can place version labels on object versions listed in the configuration record. Whenever possible, the present invention shares the derived objects produced by builds among users. This saves both time and disk storage. In a build that involves execution of multiple makefile build scripts, the scripts can execute in parallel, either on a single host or on a group of hosts in the local area network. A view's configuration spec can be defined in terms of the configuration records produced by previous builds. The exact source base for an individual program or an entire release can be recreated instantly in a new view, thus guaranteeing rebuildability of software systems.

The system minimizes data duplication, both for source files (elements) and for build targets (derived objects). A source file version is copied only when a developer wishes to modify it. If a build script would create a redundant copy of an object module or executable, the system automatically creates a link to an existing instance. Versions of text files are stored efficiently as deltas, much like SCCS or RCS versions. Versions of non-text files are also stored efficiently, using data compression.

In general, in one aspect, this invention features a data processing system and method for controlling versions of data, including a processor for executing instructions and for retrieving data objects from and storing objects to a storage device, a storage device for storing versions of objects, and an object version selector for providing the processor with access only to specific versions of target data objects as determined by a set of selection rules. The selection rules are evaluated for an object when that object is accessed by the processor. Preferably, the version selector includes a means for viewing the selected versions of the target objects as a transparent file system having directories, files, and links.

In preferred embodiments, each data object has a pathname for accessing the object from the data storage device, and each pathname has pathname components listed in sequential order. The version selector applies version selection rules to a target object determined by matching an N component wildcard pattern to the final N components of a pathname. The version selector applies the existing version selection rules to newly created objects, and can also store the identity of a selected object version in a cache memory. The version selector invalidates the cache upon detecting a change to the identified object version which could affect that version.

In yet other preferred embodiments, the version selection rules include a rule for selecting that version of an object that was the most recent version of that object at a specific time in the past, and a rule for selecting that version of an object that was the most recent version of that object at the specific time that a process requiring that object began. The time that the process began is adjusted to compensate for time skew among the storage devices storing the required objects. The process includes a system build.

In still other preferred embodiments, the versions of data objects are conceptually stored along branches of a tree structure, with each sequential version of an object being stored as the next version of that object in the same branch, and parallel versions of an object being similarly stored along a parallel branch having its source at a version of the object on another branch. The version selection rules include a rule for automatically creating a new parallel branch when a version of an object, is accessed for modification creating a new version of the object. The new version of the object is subsequently stored in the newly created parallel branch.

In yet other preferred embodiments, the storage device stores attributes associated with each version of the objects. The object version selector includes search means for accessing a version of an object determined by the state of the associated attributes. The objects include files and directories. The directory objects include a catalog of objects and their associated names, each catalog object referring to all versions of that object. The version of a directory data object is independent of the versions of the associated data objects listed in the directory data object.

In general, in another aspect, the invention features a data processing system and method having an object selector including an auditor for recording, as an audit record, which versions of objects are accessed by the processor during a data processing process. Preferably, the data processing process is a system build process producing derived objects. Each derived object is associated with an audit record.

In preferred embodiments, the system build process starts the auditor prior to executing commands which produce derived objects, and stops the auditor when those commands are completed. The process also includes any arbitrary sequence of commands. The auditor records version information for an accessed object only once regardless of the number of accesses made to that object during the production of the audit record. An audit cache memory stores the most recent audit entries made by the auditor while producing an audit record. A linker is also provided for linking a common identifying label to each object version whose identity is recorded as an entry in an audit record associated with the identifying label. An audit record comparator is provided for determining the difference between source object versions used in building two or more derived object versions.

In general, in another aspect, the data object version selector of this invention includes a system builder for executing a system build process producing derived objects from versions of source object selected by the version selector, and an audit for recording, as an audit record, which versions of the source objects are accessed through the object version selector during a system build process to build a derived object. The system builder includes a comparator for comparing the audit record, associated with a derived object produced by a previous system build process and stored in the storage device, with the requirements of a currently executing system build process to determine if the previously produced derived object can be reused to satisfy the currently executing system build process.

In preferred embodiments, the comparator compares the source object versions used in producing the previous derived object with the source object versions to be used in producing the corresponding derived object by the currently executing system build process, and the system build process reuses the previous derived object if all the compared source object versions match. Public storage is provided for storing data generally accessible by any object selecting means, and private storage is provided for storing objects generally accessible by only an associated object version selector. Derived objects produced by a system build process are stored in the private storage means when first created. A derived object stored in the private storage is moved to the public storage when a system build process using an object selector other than the associated object selector reuses the derived object. The derived object can be stored in the data storage device as a versioned object.

BRIEF DESCRIPTION OF THE DRAWINGS

The foregoing and other objects, features and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed upon the principles of the invention.

FIG. 8 illustrates an example of an event record tracing the version history of an object.

DETAILED DESCRIPTION OF THE INVENTION

Figure 1:
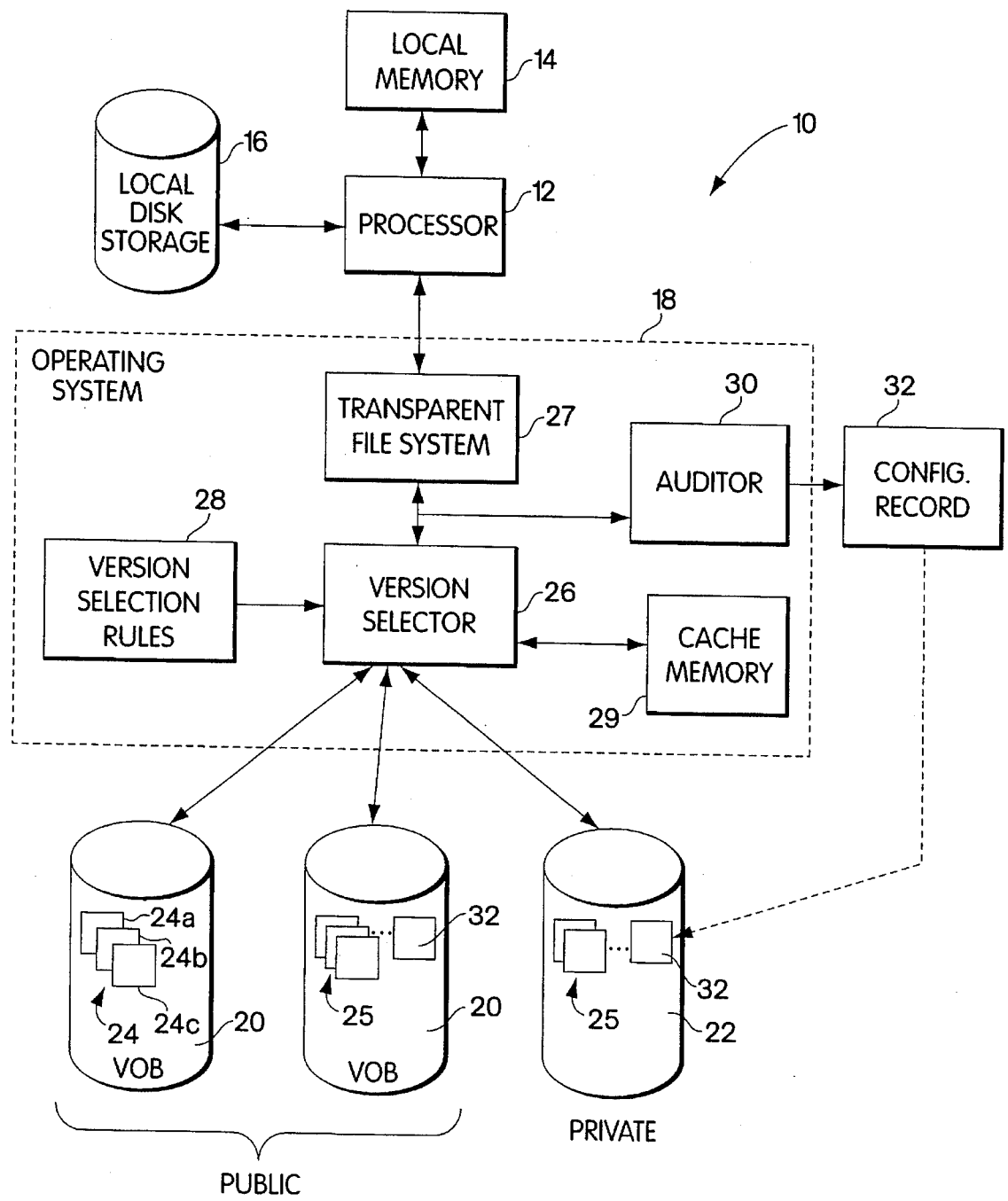
FIG. 1 is a diagram showing a preferred embodiment of a data processing system incorporating the version control system of this invention.

Referring to FIG. 1, a data processing system 10 featuring the version control system of this invention includes a processor 12 for executing instructions, a local memory 14, and a local disk storage device 16. Processor 12 uses an operating system 18 to interface to a public storage device 20 and a private storage device 22. Each public storage device 20 and private storage device 22 stores multiple versions of source objects 24 and derived objects 25. Derived objects 25 are typically created by running a system build process on particular versions of source objects 24.

Operating system 18 includes a version selector 26 for selecting a particular version of an object 24 for use by processor 12 according to version selection rules 28. The selected version of an object is presented to the processor 12 through a transparent file system interface 27. A cache memory 29 can be provided for storing the identity of selected object versions, and can be invalidated upon detecting a change to the object, the object selection rules, or otherwise, which could affect the selected object version. An application or other process running on the processor uses the selected version of the object without any need for further modification or translation of the object. Operating system 18 also includes an auditor 30 for recording an audit (configuration) record 32 of the object versions used by the processor for a particular process. These object versions can be selected by the version selector 26 according to the version selector rules 28, or they can be selected in another manner. The audit record 32 can be associated with particular derived object versions and stored along with those versions for future reference. For instance, where a system build process creates a derived object 25, the audit record for the created derived object includes the identities of the source object versions used in creating that derived object. The audit record can be stored along with the derived object to be used as historical information for the derived object. For example, another system build process can compare the audit record of the derived object to its own build requirements to determine if the version of the derived object can be reused.

Figure 2:
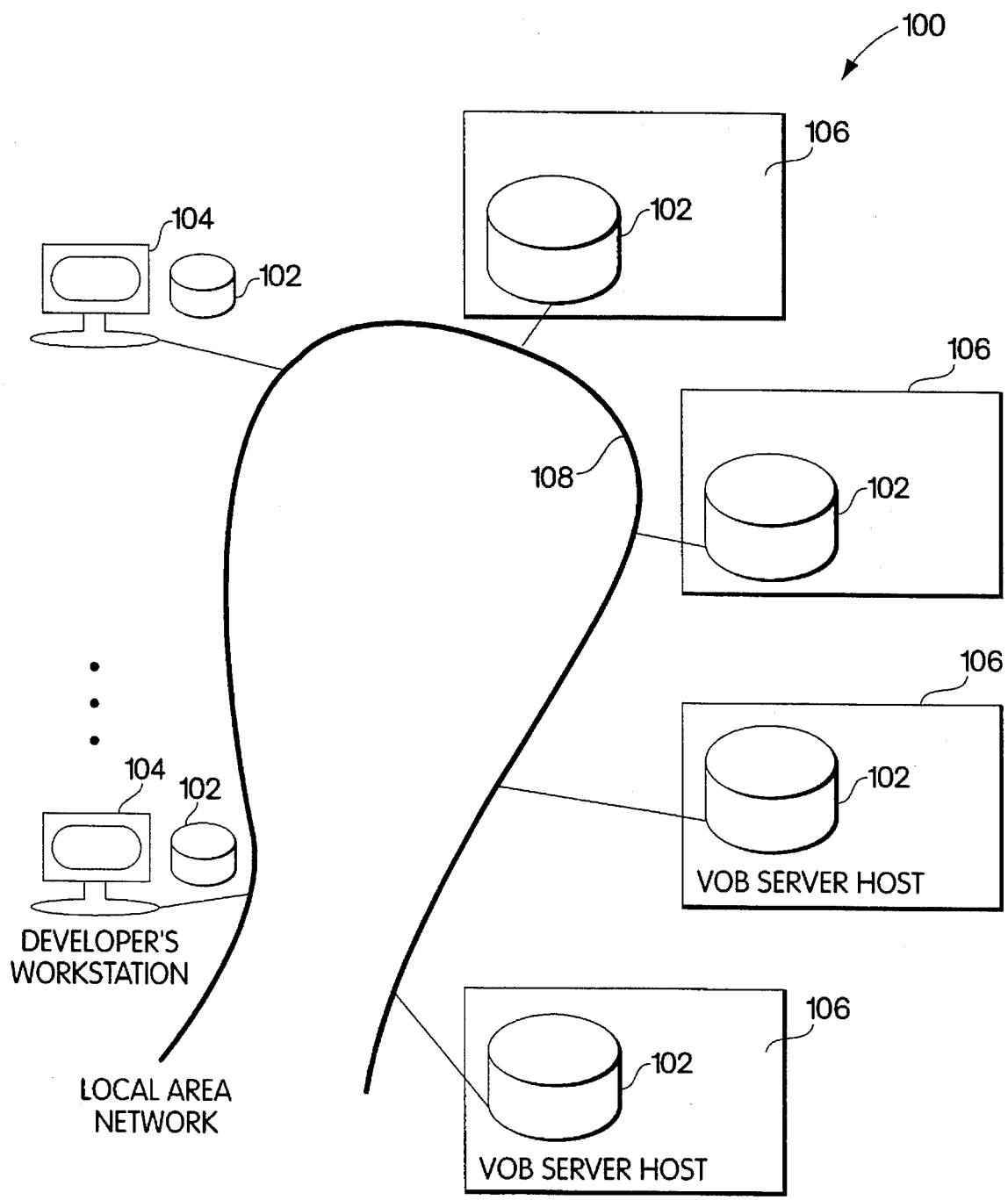
FIG. 2 is a diagram of a preferred embodiment of a distributed data processing system featuring the version control system of this invention.

Referring to FIG. 2, a preferred embodiment of a distributed computer system 100 featuring the version control system of this invention includes a scalable client-server architecture having distributed data storage where source data objects are stored on mountable file systems 102, called versioned object bases (VOBs).

VOBs 102 can be physically located throughout a local area network 108, and be mounted on various workstations 104 and server machines 106. For instance, in a UNIX environment, hosts can mount any number of VOBs 102 with the standard UNIX mount(1M) command. Further, the data storage for an individual VOB can be distributed across the network, even to hosts that are not running version control software. This scalable client-server architecture optimizes usage of network resources.

Typically, VOBs 102 containing shared data (and associated server processes) are located on high-speed network server hosts 106. Developers and their "views" of the VOBs are located on individual workstations 104. As additional developers and their workstations are added to a development project, more compute and storage resources become available for the version control system usage.

A typical VOB host 106 can be set up to manage satisfactorily the "traffic" for about a thousand source file elements (and their many versions) and the derived objects for hundreds of build targets, as generated by about 20 concurrent users. To achieve this performance level, the machine could have a minimum of 20–35 MIPS processing power, 64 Mb of main memory, and 1.5 Gb of disk storage. The kernel of the VOB host may need to be reconfigured for a greater number of processes and file description. For example, the typical VOB described above might require 128 processes and 850file descriptors.

As described herein, the distributed computer system 100 can operate using the Unix environment. The following description of the version-control system of this invention assumes that the distributed computer system 100 is operating with a standard UNIX environment and the description has been tailored for such an environment. However, it should be noted that the version-control system of this invention is also applicable to operating systems other than UNIX.

Client workstations supporting a single user can have a minimum of 10–15 MIPS processing power, 16 Mb of main memory, and 300 Mb of disk storage. An additional 8–16 Mb of main memory will further improve performance.

The version control system of this invention can maintain many versions of each source file, non-text files, and directories. An element is defined herein as a file or directory for which the version control system maintains multiple versions. The "make element" command of this invention creates a file element and the make directory" command creates a directory element. Versions of an element are created with a combination of the "checkout" and "checkin" commands. The versions of an element are organized into a hierarchical version tree, which can include many branches and subbranches.

Figure 3:
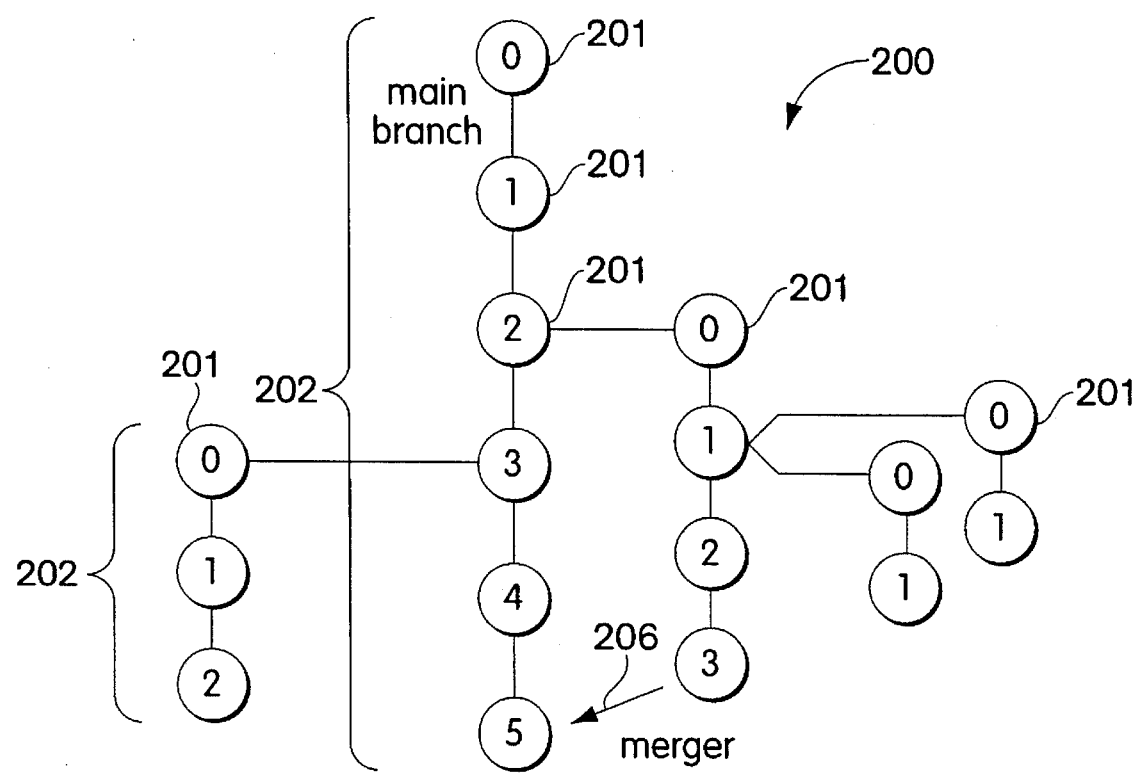
FIGS. 3–5 are diagrams illustrating file tree structures for storing multiple versions of objects accessed by the version control system of this invention.

Referring to FIG. 3, each version-controlled file 200 stored in a VOB 102 is referred to as a file element with its versions 201 organized into a version tree structure, having branches (and sub-branches) 202. Branches 202 and versions 201 can be assigned user-defined names for easy access by the user. For example, the primary branch of a version-controlled file is often called "main". Any type of file can be version-controlled, including source code files, requirement documents, design notes, user documentation, binary files, test suites, databases, etc.

Figure 4:
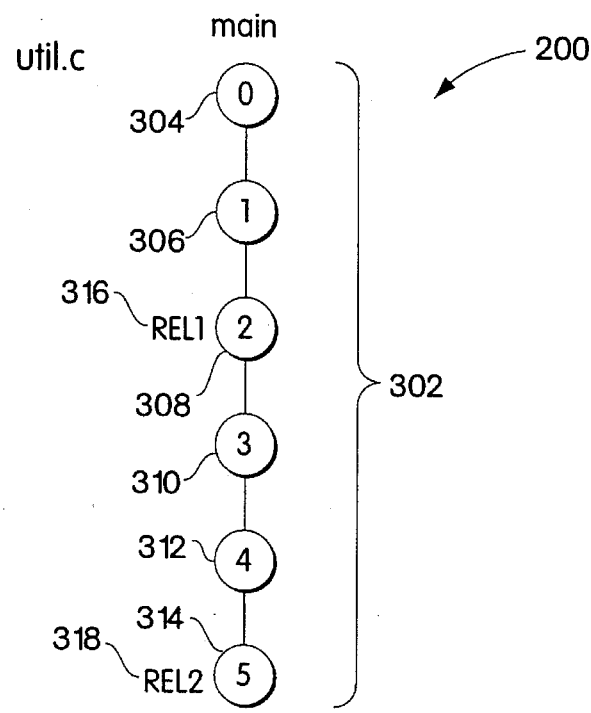

Version tree 200 can, for instance, store "old" versions of source files, enabling the rebuilding and maintenance of "old" files or software releases. Each branch or sub-branch 202 can grow independently, so that multiple variants of a versioned file can be developed concurrently. It is easy both to create a branch or sub-branch and to reintegrate the work done on a branch or sub-branch into other lines of development through an automated merger 206 operation. This allows users to keep working even when a line of development is frozen or reserved, for example, during a software integration period. In such situations, a user can work on a branch, and then reintegrate the new work into another line of development. Referring to FIG. 4, in a typical development environment, the version tree of an element 200 initially contains just a single branch 302 organized in a simple linear sequence of the element's versions 304–314. Here, file element 200 is created with a single branch 302 named 'main', with an empty version 304 numbered 0. The version-control system of this invention automatically assigns integer version numbers to versions as they are created and checked-in to the VOB. For instance, 'main' branch 302 also includes Versions 1, 2, 3, 4, and 5 of the element, 306, 308, 310, 312 and 314 respectively. One or more user-defined version labels 316, 318 can also be attached to any version. In this case label REL1 316 is defined to correspond to Version 2 of the element 308, and REL2 318 is defined to correspond to Version 5 of the element 314.

Figure 5:
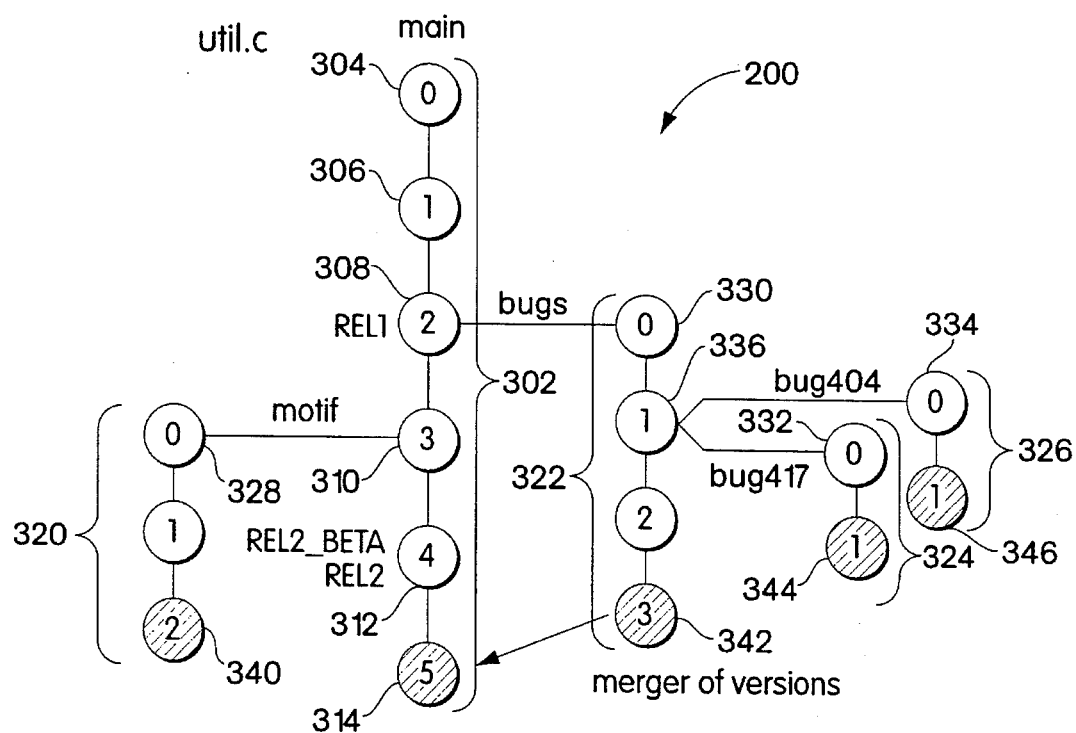

Over time, users typically define subbranches in some of the elements, in order to isolate work on bug fixing, code reorganization, experimentation, platform-specific development, and so on. The version control system supports multiple levels of subbranches. As illustrated by FIG. 5, one or more branches 320, 322, 324,326 can be created at any version. Corresponding branch names are user-defined, in much the same way as version labels. Here, branch names 'motif', 'bugs', 'bug417' and 'bug404' correspond to branches 320, 322, 324 and 326, respectively. Each branch begins with version 0 of the element of that branch, which accesses the same data as the corresponding version at the branch point. For instance, the motif version 0 element 328 accesses main version 3 element 310. Similarly, bug404 version 0 element 334 and bug417 version 0 element 332 each access the bugs version 1 element 336. Each file element 200 has a standard UNIX pathname from the top-level directory of its VOB, i.e., the VOB mount point. For example, a file element 200 might have pathname 'src/util.c'. If the VOB is, for example, mounted at '/vobs/vega' on a workstation, the element's full pathname would be '/vobs/vega/src/util.c'. As described above, each version of an element has a version-ID associated with it, which indicates its location in the version tree. A version-ID takes the form of a branch-pathname followed by a version-number. For instance, version 1 of the bug404 branch of FIG. 5 would have the version-ID '/main/bugs/bug404/1'.

The version control system of this invention controls the evolution of elements by using a checkout-edit-checkin paradigm, similar to that used by traditional UNIX version-control facilities, such as SCCS and RCS. In addition to checkout and checkin commands, the version-control system command set includes delete version, create/delete branch, list version history (chronological), list version history (structural), compare versions, merge parallel versions, and many more.

Figure 6:
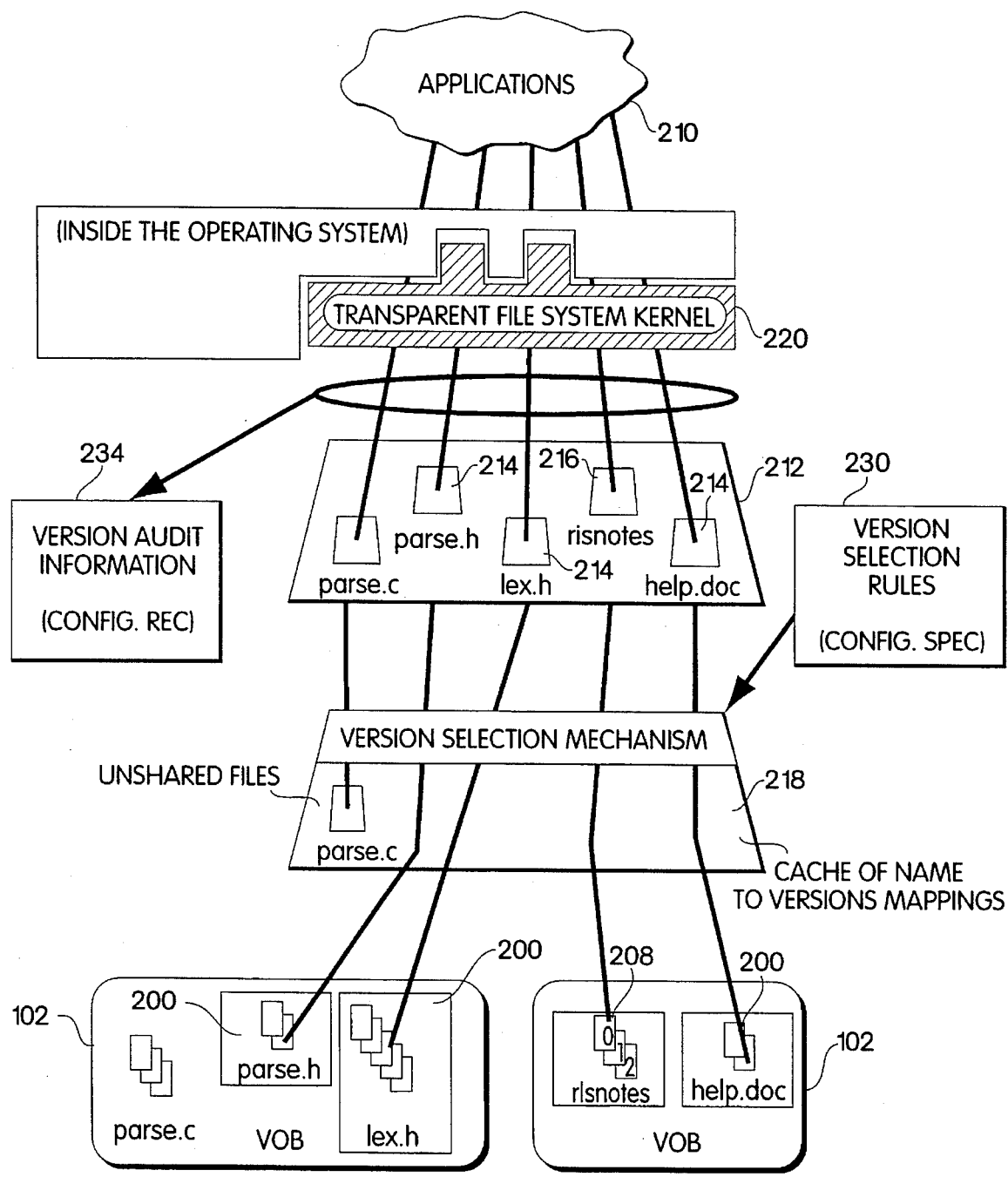
FIG. 6 is a diagram showing the version selection system of this invention implementing a transparent file system for viewing selected versions of an object stored in a versioned object data base.

Referring to FIG. 6, each directory 208 in a VOB 102 is itself treated as a versioned object called a directory element. A version of a directory element lists file elements, (sub)directory elements, and links, similar to a standard UNIX directory. Successive versions of a directory element, however, record changes to the organization of the source code base, rather than changes to the contents of individual files as a standard UNIX directory would. This includes creation of new files, renaming of files, even wholesale source tree reorganizations. Although a VOB 102 contains many versions of each file and directory, most applications 210 "see" the VOB 102 as a standard UNIX directory tree through the use of a filter called a "view" 212. This important feature is called transparency, i.e., the version-control system becomes invisible, or transparent to the application. A file element 200 appears in the view 212 to be a ordinary file 214, and a directory element appears to be an ordinary directory 216. This is accomplished by the automatic selection of one version of each element by a version selection mechanism 218. A per-view configuration specification 230 determines which version the view selects, as described in the next section.

In a preferred embodiment of the version-control system of this invention implemented on a UNIX based system, transparency is implemented at the UNIX virtual file system level by a multiversion file system Kernel (MFS) 220. Standard UNIX I/O calls (for example, read (2) and open (2)) to elements are intercepted by the MFS 220, which uses the version-selection mechanism 218 to reroute the destination of the call from an element generally, to a selected version of that element. Transparency enables the version control system to work smoothly with standard UNIX system software, commercial applications, and an organization's in-house software tools. Users do not have to discard their accustomed ways of working, or their existing tools. For example, such standard UNIX programs as 'grep', 'more', 'ls', and 'cc' will work the same way on version-controlled objects as on ordinary UNIX file system objects.

As shown in FIG. 5, the version-control system retains full flexibility where users can override transparency using version-extended pathnames to access any version of an element explicitly. For instance, file element "util.c" 200 has the version tree structure shown. A user can explicitly access any version of "util. c" by simply using the full version-extended path name. Here, version 1 on the "bug404" sub-branch can be accessed by using the full pathname "util.c@@/main/bugs/bug404/1".

Figure 7:
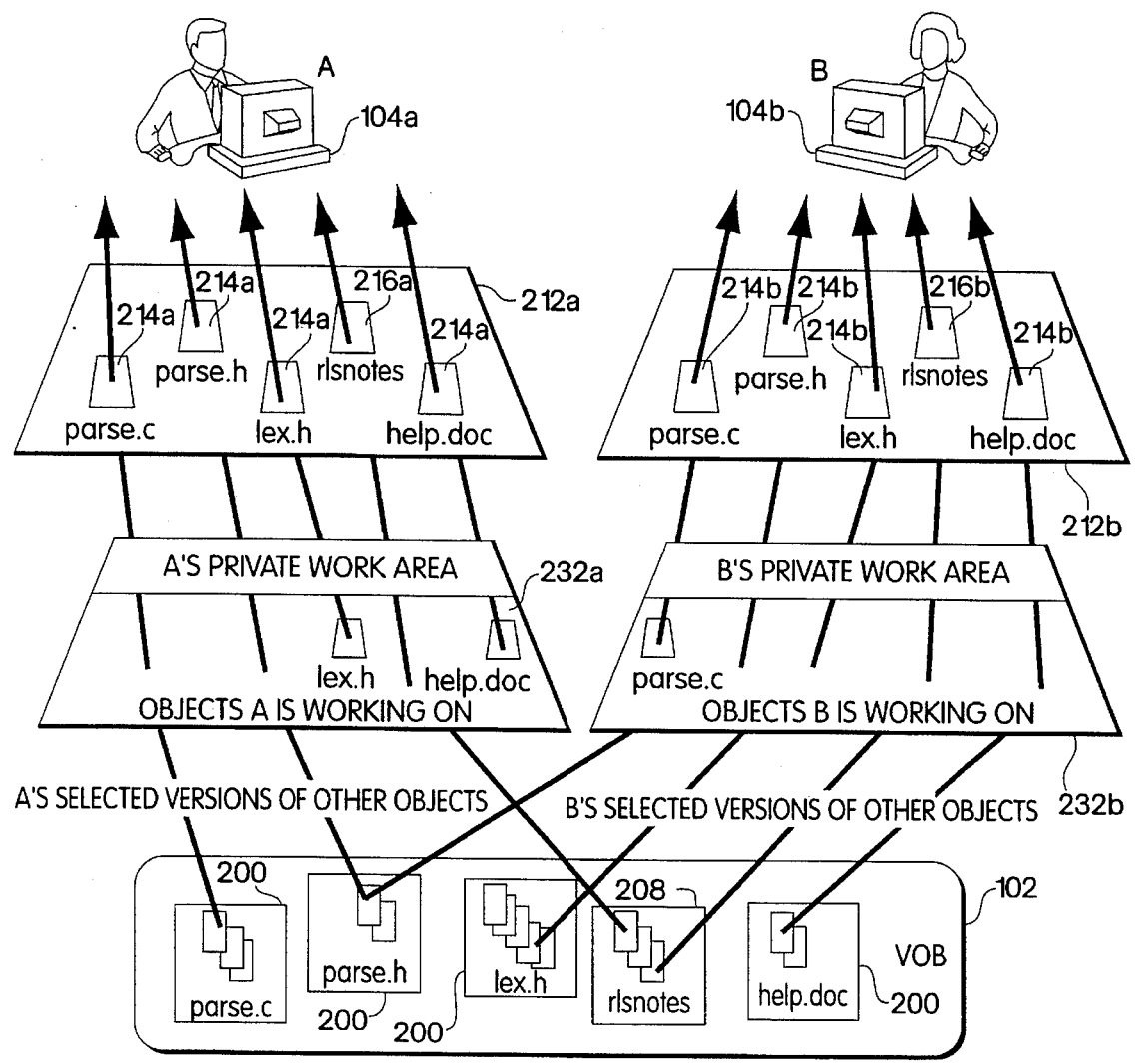
FIG. 7 is a diagram illustrating the transparent file system of FIG. 6 implemented for use by multiple users.

Referring to FIG. 7, the version-control system of this invention is designed for use by teams of developers. Each developer should be able to work cooperatively with other team members, but without interfering with their work. This system supports a well-regulated development environment by maintaining two kinds of data storage: (1) shared (public) data storage implemented by VOBs 102 and which contains information intended for regular access by all users, and (2) private data storage 232a, 232b which typically contains files that belong to an individual developer. Alternatively, private data storages can contain files shared by a tight-knit development group. "Private" does not necessarily mean that other users cannot access such storage. It simply means that the storage area is distinct from other similar areas.

Typically, each software developer working on a particular project at a workstation 104a, 104b, requires a work environment that provides access to the appropriate versions of source files related to that project. The work environment must also allow work to proceed in a way that does not interfere with, or suffer interference from, other developers who may also be using and/or modifying the source files. Both these services are provided by the version-controlled views 212a, 212b.

A view 212 can be used as a working context for an individual developer or a closely-coordinated development group. For instance, developer A working at workstation 104a uses view 212a of VOB 102 for his development work, and developer B working at workstation 104b uses a different view 212b of VOB 102 for her development work. Different views can see different versions of the same elements, under exactly the same pathnames. One view might see the most recent version of every element and another view might see the versions used to build a particular Release. Still another view might see the versions being used to fix a bug in a particular Release, along with a particular user's recent changes, and possibly all versions annotated with "Status is OK". Each user can have many views, and can "set" any new UNIX process to use any view.

The set of versions selected by a view 212 is called its configuration. View configurations are dynamic, and can be modified by the developer at any time. A view's configuration is defined by a set of rules called a configuration specification (config spec) (230 FIG. 6). For instance, in the preferred UNIX embodiment each time a program performs a UNIX 'open (2)' call on an element, a "view_server" process for that view consults the rules in its config spec, decides which version of the element to select from the VOB, and performs the operation on that version. Thus, a view is unlike a traditional development "sandbox", which configures a source tree by copying particular versions from a repository. That is, a view is not a set of files. Rather, a view is a way of "seeing" shared elements located in VOB or elsewhere. Each view available on a host can access any and all VOBs mounted on that host or on other network servers. When new versions or elements are added to a VOB, or new VOBs are mounted, those new versions, elements or VOB data are immediately accessible to all views. Developers can change their config spec rules interactively, to balance their need for isolation from other user's source code changes with their need to share such changes.

Typically, a view's configuration is defined in terms of wildcards (file name patterns) and mnemonic names, not by naming specific versions. Some examples include: "for all source files, use the checked-out version, or else the most recent version on branch fix 2.4.3, or if there is no such branch, use the version labeled REL2.4.3"; "for all source files, use the checked-out version, or else the most recent version as of 5PM yesterday, or else the most recent version on the bugfix branch whose QAed attribute has the value Yes"; and "for all source files, use the version that was used in this particular build of executable supersort".

The last example illustrates that one or more derived objects can be used to define a view's configuration directly. Simply retaining the executable guarantees that they can be rebuilt from sources.

Each developer can have several views used for different tasks, such as new program development, fixing a bug in a recent release, preparing a special program variant for a valued customer, porting to a new window system, and so on. In each view, the developer must be able to edit source files, compile the software, and test it. To enable such work to proceed without disturbing the work going on in other views, each view has its own private work (storage) area. For instance, view 212a has an associated private storage area 232a, and view 212b has another associated private storage area 232b. This "view-private storage" is used for checked-out versions of source file elements, text-editor backup files, cut-and-paste temporary files, and so on. A developer's builds are also placed in view storage, so that they do not interfere with another developer's builds.

Views are designed to be "cheap", that is, they can be created and modified easily, and they require minimal system resources. For example, a minor variant of a five thousand-file source configuration might be required to create a special software release for an important customer. A developer can create a new view in which to perform this task, and thus customize it for the task by editing a few version-selection rules to access the elements to be modified. The disk requirements for the new view are small because only enough space to store modified source files, corresponding object modules, and the executable(s) to be built is required. Most sources and object modules need not be copied or rebuilt because unmodified sources are accessed dynamically from VOB storage and object modules corresponding to unmodified sources are reused from other views.

In addition to incorporating new sources automatically, a view tracks the evolution of existing sources. A user can choose to keep abreast of changes made to element until by any developer, in any view, by configuring their view to select the most recent version of the element.

Sometimes, however, a user would rather be isolated from certain changes that are destabilizing, inconsistent with their own work, and so on. A view is fine-tunable, down to the individual file level. By editing the config spec, a user can control the extent to which their view is dynamic, automatically incorporating the work of others.

Views can be made completely static, where versions selected by the view would not change over time; slowly changing, where a view's file system configuration would probably change slowly most of the time; or fast changing, where the view's config rule might say for instance, "for source files in a particular directory, use the most recent version on the main branch".

View access to checked-in source versions involves no copying of data. If, for example, several views select version 3 of the header file usr/project/include/sort.h, the processes set to these views all access the same source text in VOB storage. A hundred programmers in a hundred views could build software using version 3 of the header file, and the total storage cost to the views for this file is zero—the single version they all share is stored in a VOB.

A view's config spec selects versions of elements. A config spec is a sequence of configuration rules, stored in the view's private storage area. Each rule maps names of elements to versions of elements. Whenever a user process references an element through the view, an associated view_server process consults the rules, one by one, in order. The first rule that produces a "match" determines which version of the element to access. It is possible for the config spec to select no version at all, in which case the element will be inaccessible in the view. A version-caching scheme enables version selection to occur efficiently, enhancing the effect on system performance.

A configuration rule can specify a "constant" version (for example, version 12 on the main branch); or it can specify a "variable" or "expression", whose value changes as development proceeds. For example, a common "variable" is the version label "LATEST", which always indicates the most recent version on a branch.

Syntactically, a configuration rule can be configured as a single line of ASCII-text, consisting of an object-class, a pattern, and a version-selector.

The "object-class" can be one or more words, indicating the kind of element to which the rule applies. For example:

| | |
|---|---|
| element | (rule applies to any element) |
| element -file | (rule applies to any file element) |
| element -type text_file | (rule applied to any element of the specified type) |

The object-class in the last example restricts the scope of the rule to a particular system defined element type. A user can also specify a user-defined element type in this context.

The "pattern" is a file name or pathname, typically with a wildcard to match multiple names, and it is similar to the pattern mechanism of the Bourne shell and C shell. A pattern can be very specific (for example, matching a single element) or very general (for example, matching any element in any VOB). Some examples of such patterns are:

| | |
|---|---|
| * | (all elements) |
| sortlib/* | (elements within any directory named sortlib) |
| *.[ch] | (elements with ".c" or ".h" extension) |
| usr/src/project/ . . . /*.a | (elements with ".a" extension in the tree under usr/scr/project) |
| usr/src/project/util.c | (element usr/src/project/util.c) |

The ". . ." is a system defined wildcard, matching zero or more intervening directory levels.

The version-selector indicates the version to appear in the view, for names that match the object-class and pattern. For example:

| | |
|---|---|
| main/1 | (version-ID) |
| /main/LATEST | (most recent on a particular branch) |
| /main/rel12/ bugfix/LATEST | |
| /main/LATEST-time 20-Apr.07:30 | (most recent on a particular branch, as of a particular time) |
| REL3 | (version label) |

Some version selectors are dynamic in that they resolve to different versions at different times. For example,/main/LATEST ("the most recent version on the main branch") and/main/rel2_bugfix/LATEST ("the most recent version on the rel2_bugfix branch") will change as users check in new versions. Other version selectors are static:/main/1 always refers to the same version; REL3 always refers to the same version (unless the version label has moved or deleted).

Two of the example above involve user-defined metadata, the branch name rel2_bugfix and the version label REL3. The version selector can also involve more complex queries on any kinds of meta-data.

If a view merely provided read-only access to shared data, it would be of limited use. Software development involves continual change. In the course of working, a user typically needs to create and modify many short-lived files: text editor backup files, alternative versions or portions of source modules, object modules (.o files), compiler listings, test data files, mail messages, to-do lists, and so on.

Each view has a private storage area, in which such files are created. Such data is actually stored in the view storage area, specified when the view is created.

For example, a user checks out branch/main of file element msf.c, whose VOB is stored on host mars. An in-place, view private copy of msf.c@@/main/LATEST is created in the user's view private storage area, which is on host jupiter. Any temporary or backup files go into the view-private storage area on jupiter. When the user builds, newly-built targets (derived objects) are placed in view-private storage. When the user performs a checkin, the user checked-out file is copied from view-private storage on jupiter to VOB storage on mars.

View-private storage ensures that developers have enough "elbow room" to work effectively, without getting in each others' way. Two developers can modify, build, and rebuild the same software system in the same VOB directory, without "stepping on" each other's files.

The derived objects created by software builds are shareable among all views. When a programmer issues a command to rebuild a particular module, the system can determine if it is appropriate simply to reuse an existing version of the module that was built in another view. There appears to be a copy of the program in both views, but in reality, a single copy is shared between them. The system automatically "promotes" the data container of this single copy from view-private storage to VOB storage.

The config spec mechanism does not extend to view-private objects. A view's private files, directories, and links automatically appear in the view. In effect, the view_server process first projects selected versions of elements into a user view of each VOB directory. Then, the process overlays the directory with any view-private objects that have been created there.

There can be name collisions in the overlaying process. In this case, the private object eclipses (hides) the element or VOB link with the same name. Standard UNIX commands can "see" only the private file. Other commands can see the element or link, listing it as eclipsed. If a user deletes the private file, a version of the element or the link reappears in the user's view.

A special case of eclipsing is common. When a user checks out a version of a file element, the system copies that version, creating a view-private file. The user's text editor accesses the view-private file, which eclipses the element.

The lsprivate ("list private objects") command lists the view-private objects in a directory, including checked-out versions of elements, view-private files, directories, and links, and derived objects built in the private view (view derived objects).

Furthermore, both views and VOBs are network-wide resources, accessible through NFS services. This facilitates team-oriented development, and enables data managed by the version-control system of this invention to be used on hosts where version-control system software has not been installed. A view can be "exported" to hosts in the network on which the version-control system is not installed. Users on such non-installed hosts can examine version-controlled data as seen through the view and can also perform builds using the data. They are restricted, however, from altering the version-controlled data, and cannot use any value-added features of the version-control system.

The version-control system of this invention is compatible with standard UNIX development tools and practices. Transition to implementing the system can be incremental, with some development groups making the switch before others. The system can include tools for importing version-controlled files from other systems, such as SCCS and RCS. The following outline of a typical development cycle demonstrates the version-control systems' compatibility with other systems. To start working, a developer creates a shell process that is "set" to a view, then uses the standard UNIX 'cd' change directory command to visit any source directory in any VOB. There is not need to copy data to a "parallel source tree". All child processes of the shell, for example, those of third-party applications, will also be set to the view. All of the developer's shell-oriented tools (aliases, file name completion, command-output substitution, scripts, and so on) remain available as the developer works on through the view data.

The developer cannot modify a source file element until it is "checked out". An element appears as a read-only file until the developer issues a checkout command to make it writable. Only the developer (and other users using the same view) can access the writable, checked-out version. The developer edits the file "in-place." That is, there is no need, for example, to copy the file to an area under his or her home directory. The developer can build the software system with the standard UNIX 'make(1)' utility, with another build utility, or with any other UNIX facilities (for example, shell scripts). As with editing, building occurs "in-place", therefore developers working in different views can build the same software without interfering with each other.

Long-lived software development projects typically involve many programmers, each performing software builds that use tens, hundreds, or thousands of source files. The projects also involved many others (for example, technical writers) who use many files, which go through many revisions. Although the users are all working toward the same overall goal, they are working at different rates, and on different parts of the product. Some are forging ahead on the next release; others are fixing bugs in one or more old releases; others are porting to new hardware or software platforms; and so on.

Each developer needs a certain set of sources with which to work. Different tasks (for example, bugfixing vs. new development) require different versions of the source files. That is, different configurations of the source tree. Ideally, specifying a configuration of sources is both easy, requiring little work by the developer, and efficient requiring little expenditure of compute time and disk storage.

A developer typically needs an isolated workspace in which to edit, compile, test, and debug. Ideally, the isolation should be relative, not absolute. If other developers are doing related work, each should be able to find out about it and use it if appropriate. A developer should be able to integrate changes being made in other parts of the product into their own builds, and should be able to shut out such changes until a later integration period if they prove destabilizing.

At one extreme, a programmer can achieve total isolation by copying all files required for development to a private "development sandbox". This is wasteful of disk space and discourages sharing of files. Moreover, integrating the work performed in different sandboxes is difficult.

At the other extreme, a programmer's sandbox can contain symbolic links to files from a central storage area. This implements sharing, since many links can point to the same file or directory. But this scheme makes isolation difficult to achieve because a change to a file in the central storage area automatically "appears" in every sandbox, possibly causing disruption in many of them. A difficulty with both these schemes is that they are too static, it is difficult to switch a file of subsystem to an older version or to a new variant of the current version.

The alternative to the traditional development sandbox is the view of this invention. The view is a dynamically-managed configuration of the entire file system. When working in a view, a developer sees selected versions of the data and programs under system version control, and can also see all the other data and use all the programs available on the host. In addition, a view provides a "virtual workspace", in which a developer, and perhaps other developers can perform day-to-day tasks in partial isolation, for example checking files in and out, editing source files, building software, debugging entire systems, and so on.

Unlike the traditional sandbox approach, using a view does not require the creation of a shadow development tree. A view acts as a "version broker", interacting directly with the "real" development tree, stored in one or more VOBs. VOB storage can be distributed throughout a network or concentrated on fast file-server hosts.

Each VOB can be mounted as a UNIX file system, which is fully compatible with the Network File System (NFS). Thus, the set of files and directories accessible on a host may encompass standard file systems and VOBs mounted from other hosts in a local area network. When any UNIX process references a version-controlled object (file or directory element) through a view the system selects a particular version of the element for the process to use. A view is not simply a static list of file and directory versions, a snapshot of certain data at a particular moment. Rather, it is a continually-updated image of the entire development tree. Selecting a version involves no copying of data or linking of files. The actual contents of a selected version is not stored in the view at all, but remains in its VOB. The version is merely mapped into the view's UNIX file name space.

A view performs version-selection automatically, making elements with large complex version trees appear to be simple files and directories. That is, a view makes the versioning mechanism transparent. A user can use standard UNIX commands and any local or third-party UNIX tools to work with your version-controlled data. Automatic version-selection does not prevent explicit access to other versions. A user can use special extended pathnames to access versions of the element not selected by the view, and versions selected by other views.

All the files and directories not under version control (standard UNIX files, local scripts and programs, and so on) are always visible through a view. A user can use any data file, shell script, or complied program available on your system when working in a view.

Each view has a private storage area, which stores several kinds of data, including checked-out versions of file elements, derived objects created by builds in that view, and any other files and directories created within VOB directories by the view's user(s), using standard UNIX programs. These are termed 'view-private' files and 'view-private' directories.

View-private objects include various kinds of transient files: text editor backup files, scratch files to store sections of source code, to-do lists, files to save incoming mail messages, and so on. These are not version-controlled, even though they appear to be in a VOB directory. In effect, view-private storage acts as an "overlay" on the VOB directories with which a user works. In each VOB directory, a version of each element that is not checked out to a view is projected into the UNIX file name space. These objects actually reside in VOB storage, and a view accesses them on a read-only basis. Then, a view adds any view-private objects to the file name space, which are read-write objects and reside in view-private storage.

In day-to-day usage, a user need concern himself only with that user's view config spec (and even then, only occasionally). Once a user activates a 'view_server' process, it automatically manages view-private storage. The view-private files in one view are distinct from those in all other views. For example, a private filed named/user/project/to_do.list can exist in two or more views, with no conflict. Moreover, two ore more users can build software in the same directory without interfering with each other, as long as they are in different views. Configuration rules support both "broad-brush" and "fine-tuned" approached to configuring views. An entire development tree can be configured with just a handful of rules, which apply to all files and directories. When it is required, fine tuning can be implemented at the individual directory or individual file level.

Since the rules in a config spec typically involve file name patterns (wildcards) that apply to many files and/or directories, a view is "open-ended". New directories or even entire newly-mounted VOBs are automatically incorporated into a view. There is no need to "add files to a view" explicitly.

Contrast this with a traditional approach. The typical sandbox is a static "snapshot" of a small piece of the source tree. The snapshot may be adequate to a programmer's needs at that moment, but when he or she gets a new assignment, it if often necessary to "graft" a new part of the source tree to the sandbox. Moreover, a sandbox does not track changes to the structure of the source tree itself. When a new project is started, the sandbox requires yet another "graft" before it can been used for this work.

The version-control system of this invention also features an enhanced "build utility" command 'clearmake' which is compatible with the standard UNIX 'make' command, but offers a powerful set of additional features. For each build script it executes, the 'clearmake' build utility command stores a configuration record (config rec) (234 of FIG. 6) that details the build process, i.e., an audit of the build process. The config rec 234 includes "who, what, when, where" information, along with a list of exact source file versions used, tool dependencies, a copy of the build script used, and any build options specified on the 'clearmake' command line, in the environment, or in a build options specification file. The list of versions is constructed by auditing the actual UNIX file system 'open(2)' calls performed by the compiler and other tools participating in the build, which ensures the correctness of the config rec created.

The version-control system automatically associates the config rec 234 with each derived object produced by the build script, for example, a derived object module and a derived compiler listing file. These derived objects are automatically tracked by the version-control system.

The 'clearmake' build utility also provides for automatic detection of source dependencies. The config rec keep track of all source dependencies, for example, dependencies on header (.h) files. This means that developers need not declare source dependencies in their makefiles.

The build utility also coordinates derived object sharing. Instead of invoking a build script to create a target object, the 'clearmake' command can instead find an appropriate derived object that was already built in another view. This creates, in essence, an additional hard link to the derived object, causing it to be shared by the multiple views. This capability saves both disk storage and build time. Furthermore, the 'clearmake' command can execute multiple build scripts in parallel. These parallel executions can take place on a single multi-processor host and/or on several hosts throughout the local network.

The version-control system of this invention also features a 'checkin' command which creates a new version of an element the new version instantly becomes available to all views, and visible in views that have been configured to "see" the latest version of that element. Developers can monitor and compare each others' edits and builds with other special commands which: list checkouts, list history, list derived objects, list/compare config recs, compare source versions, and so on.

In addition to providing tools that control sources and derived objects, the version-control system also provides tools for monitoring and controlling the development process itself. Administrators can use these tools to automate the enforcement of an organization's existing policies. There are several aspects to process management, including recording state information about the process, notifying developers and administrators when an interesting state has changed, and the enforcement of policy objectives. The process management tools of this invention rely on 'metadata', information that pertains to, but is separate from, the actual contents of file and directory elements.

Meta-data is stored as attributes, each attribute representing the state of a particular aspect of the associated element. Each meta-data attribute is defined by an attribute name=value parameter. Attributes can be attached to most kinds of objects. They can take many kinds of values, including integers, strings, dates, and others. The values can be constrained to a certain range, or to a certain enumerated set. For example, a 'CodeQuality' attribute referring to the quality level of the associated software program file can be defined to have the graded value A, B, C, D, or F. Powerful query commands that work on the meta-data enable users to find, for example, all versions created by user Jones in the last month with a CodeQuality of A. Enforcement mechanisms, discussed below, can automatically assign attributes.

Some examples of meta-data attributes are:

TABLE I

| NAME | VALUE | TYPE |
| --- | --- | --- |
| QAed | "Yes" | string |
| CodeQuality | 3 | integer |
| QAedBy | "george" | string |
| ECOnum | 8987 | integer |
| Benchmark | 34.1 | "real" |
| LastQAed | 14-Apr.08:45 | time |

As with version labels, a user can attach one or more attributes to any version of an element. Attributes can be attached to other file system objects as well, including elements, branches (not just individual versions) and VOB symbolic links.

A meta-data hyperlink is a logical 'arrow'that connects two objects. For example, a hyperlink can connect a design document to a source code module. Hyperlinks can relate whole elements, specific versions (as needed for requirements tracing), or sub-sections within objects. Hyperlinks can cross VOBs and can handle the renaming or moving of an object to its VOB. Either end of a hyperlink can be annotated with a text string. Some examples of hyperlink include: hyperlink which connects a source file element that defines runtime error messages with a document file element that contains a user manual's "Error Messages Appendix"; set of hyperlinks which define a "network" of elements that must be modified as a group, even though there are no source-code dependencies among them; and hyperlinks which indicate that versions of an element have had their contents merged.

A hyperlink object connects two objects, each of which may be a version, branch, element, or VOB symbolic link. The objects can be in the same VOB, or in different VOB's. The hyperlink connects the objects themselves, and so persists even if the objects are renamed or moved to different directories.

A user can attach several hyperlinks of the same type to one object. However, only one instance of a particular label, attribute, or trigger type can be attached to an object. For example, a user cannot attach two different ECOnum attributes to the same element, with two different values.

Each hyperlink object has a unique system-assigned hyperlink-ID, which distinguishes it from other hyperlinks of the same type. For example, the same design document may correspond to three source files. For instance, a user can create three hyperlinks named design_for, all starting from the design document. Each will have a different hyperlink-ID such as: design_for@374; design_for@379; and design_for@384.

Important meta-data state information is recorded automatically by the version control system to provide an event history The "who, " "when" and "why" (user-supplied comments) and other important data is gathered whenever an object is changed. Similar information is retained about all objects that are built or released.

Triggers based on meta-data values can implement policies, permissions, and restrictions that manage the development process and the development environment. For instance, meta-data triggers can be used to control various aspects of the version-control system. A preevent trigger can monitor the usage of a specified system operation (for example, 'checkin'), or a class of operations (for example, "any command that modifies a VOB"). When a user performs the operation, the trigger fires, executing a specified procedure such as a program, shell script, or one of several built-in actions. A trigger can require that some check be applied before the command is allowed to run. It can also allow the command to proceed, or it can cancel the command. Some examples of triggers include: send mail to a development manager and/or technical writer when a file element is checked in; send mail to all developers when any header (.h) file is modified; send mail to a project manager when a new branch is created in any element within a directory; and attach an attribute to a new version of any source file, indicating the ECO number of the project that occasioned the change.

In addition to attached triggers, this invention provides additional kinds of triggers, which facilitate the creation of "complete" process management structures, monitoring all development activity. Element-global trigger types are automatically associated with all of a VOB's elements, or to all elements with particular element types (for example, all file elements of types text_file and c_source).

A post-event trigger is a monitor that runs after a specified operation completes. Typically, such a trigger notifies one or more users that a command was executed, or attaches an attribute to an object. The system can set environment variables automatically for use by the shell script or program implementing the trigger action. For example, a post-event trigger on the 'checkin' operation might send mail to the quality assurance department explaining that a particular user has modified a particular file. The mail message might include the comment that the user supplied during the 'checkin' operation.

A 'lock' can be applied to an object based upon meta-data to stop the modification of that object. Locks can be fine-grained for example, locking a particular element, or general, for example, locking an entire VOB. A typical application will lock just the main branch of all elements during a software integration period. Each lock can have an "exceptions list" where the object cannot be modified except by the specified list of users.

UNIX-like protection modes can be applied to all elements using meta-data. These access protections can control reading, writing, and executing of objects at the traditional levels granularity, for instance, user, owner, group, and other. They also apply to the physical storage in the underlying file system. Protections effectively thwart attempts to circumvent the version-control system and tamper with the raw storage.

Perhaps most importantly, meta-data makes it easy to define and maintain collections of file system objects. The collections often take the form of entire sources trees (VOBs), as seen through a particular view. Meta-data plays an important role in the configuration rules that define views. A simple (or sophisticated) meta-data query can "gather together" hundreds or thousands of objects, based on their roles in the development process.

Some kinds of meta-data can be automatically recorded by the system as development tasks progress. For instance, many system operations (checkout, checkin, merge versions, and so on) cause an event record to be created, containing information about that operation. This record, stored in a VOB database, captures the "who, what, when, where, why" of the operation: login name of the user who entered the command, kind of operation, date-time stamp, hostname, user-supplied comment. This record is associated with the objects involved in the operation. Typically, the objects are versions or elements, but they can also be the user-defined meta-data objects discussed below. The 'lshistory' ("list history") command displays some or all of the event records stored in a VOB. An example of such an event record is shown in FIG. 8.

With the version control system of this invention, users and administrators can also define and use several additional kinds of meta-data. Though they serve a wide variety of purposes, all user-defined kinds of meta-data share the same two-level implementation scheme. A user can define a meta-data item for use within a particular VOB. This is accomplished by creating a VOB object called a meta-data type. Thereafter, users can create instances of the meta-data type. In some cases, this creates a new VOB object. In other cases, this creates a new "field" in an existing object. These latter cases can be typically described as attaching the meta-data to the file system objects.

Figure 9:
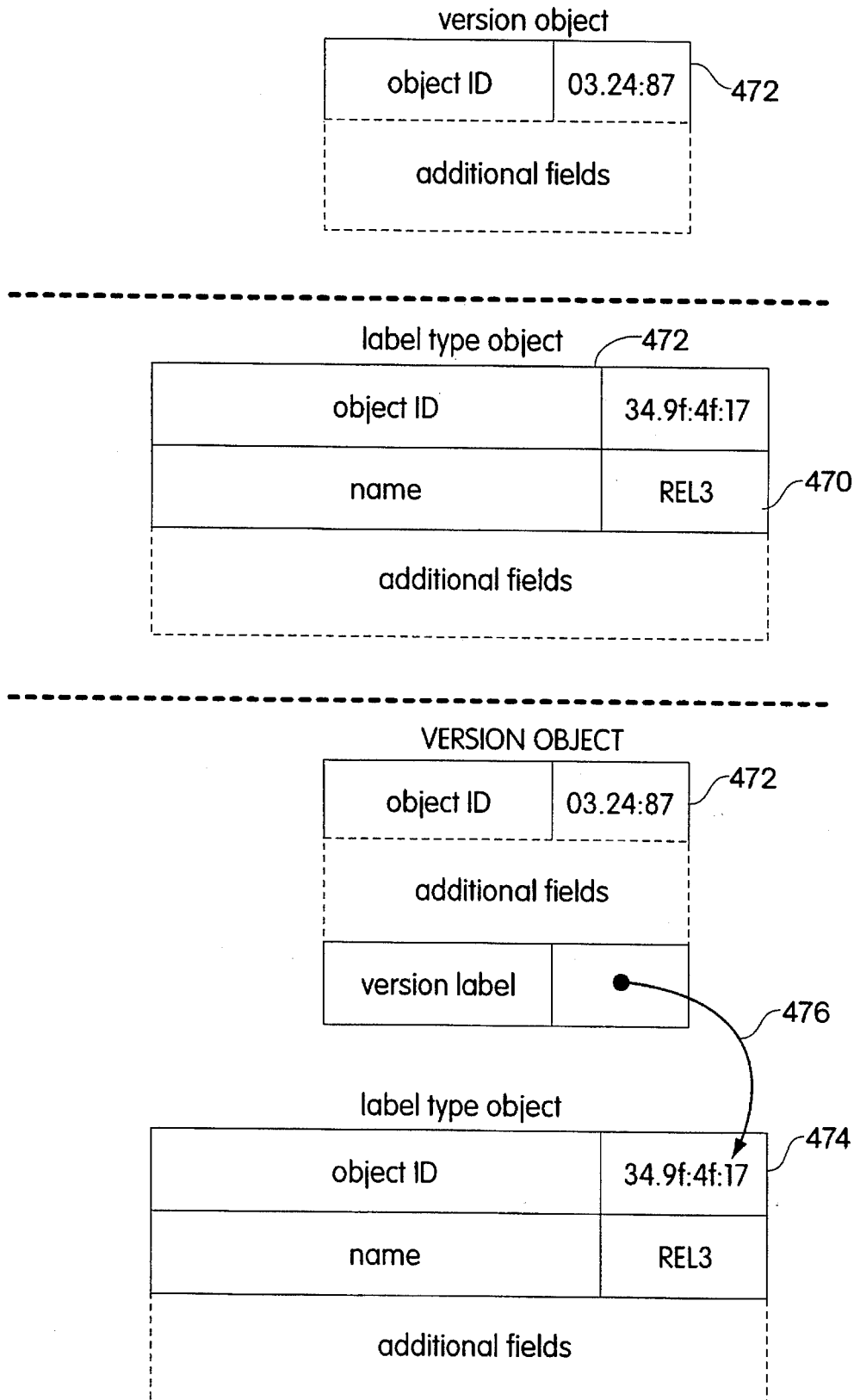
FIG. 9 shows an example of a two-level meta-data implementation scheme implemented by the version control system of this invention.

FIG. 9 shows an example of how the two-level implementation scheme works. A user can attach a name 470 called a version label to a version 472 of one or more elements. But a user cannot simply think up a name (for example, REL3) and attach it to a version of some file or directory. Instead, the user (or some administrator or manager) must first define a meta-data label type 474 with name REL3. Thereafter, any user can attach REL3 label object 474 to versions of elements in that VOB. Attaching the label creates a reference pointer from the version object 472 to the label type object 474. Further, any version can have one or more labels.

The two-level implementation of meta-data introduces an extra step, but this level of indirection facilitates administration and process control. A typical VOB contains many elements and versions. Users can create instances of meta-data types in many of these objects. The two-level implementation scheme allows a large number of instances to be created (and controlled) using a small number of meta-data types.

The version-control system of this invention also features automatic branch creation for automatically creating a branch with a specified name when elements are checked out. Maintenance work is best organized by requiring that all modifications to elements be performed on branches of the same type.

A config spec rule can select versions in terms of labels, attributes, hyperlinks, and event history. For example, a config spec can select "the latest version with the Passed QA attribute, otherwise the most recent version created by user Jones".

The version-control system of this invention also includes a variety of source control and software release management features. Source control relates to the files that go into software buildings and release management relates to the files that are produced by software builds, and are subsequently exported to other developers or projects, or placed on release media for distribution to customers.

During development, many derived objects are produced. Most of these derived objects are short-lived, because developers continually revise sources and rebuild objects. Eventually, a "good" build is deemed ready for release by the developer, a manager, the QA Department, and so on.

A Release Engineering group might maintain one or more "release VOBs". The directory structures of these "release VOBs" would mirror the hierarchy of files to be created on the release medium. These directory structures can be modified from release to release, since directory elements are also version-controlled.

Given this setup, the release process used might be organized as follows: The derived objects produced by a "good" build are released by checking them in as versions of elements in a "release VOB". An appropriate version label (for example, REL2.4.3) is attached to each of the checked-in derived objects. The config recs of the derived objects are used to apply the same label to all the source versions that were used in the "good" build. When all files to be shipped have been released in this manner, a release engineer configures a view to select only versions with label REL2.4.3. As see through this view, the release tree contains exactly the set of files to be released. To cut a release tape, the engineer issues a simple UNIX 'tar(1)' or 'cpio(1)' command to copy the appropriately-configured release tree.

This organization makes release maintenance easy. For instance, if a customer reports a bug in Release 2.4.3, it is simple for a maintenance engineer to define a view that reconstructs the release's source base. The view would, for instance, implement the rule "for all elements, select the version labeled REL2.4.3" or "select the source versions that were used to build version REL2.4.3 of derived object 'supersort'". Subsequently, that view can easily be modified to include the changes required to fix the bug. The view would then, for instance, implement the rule"for all elements, select the most recent version on the branch named rel2.4.3 fix", or "select the version labeled REL2.4.3", or "select the source versions that were used to build version REL2.4.3 of derived object 'supersort'".

Most common development tasks (editing, compiling, and so on) deal with just one version of each element. The transparency feature of the views allows an element name to reference a particular version automatically. For example, referring again to FIG. 5, the name util.c might transparently reference the particular version '/main/4' 312 of element util.c. As another example, the versions 314, 340, 342, 346, 344 at the end of the branches of the complex version tree in FIG. 5 (the ones that are shaded) respectively have the following version-IDs: /main/5;/main/motif/2;/main/bugs/3; main/bugs/bug404/1; and/main/bugs/bug417/1

Typically, a view automatically accesses one version of an element by default, as specified by the rules in its config spec.

The version-control system of this invention can manage different kinds of elements. Each element is created with a particular element type, which determines how the system will manage the contents of that element's version. The 'chtype' ("change type") command can be used to change the type of an existing element.

Predefined file element types include: 'text_file', non-NULL bytes, separated into "text lines" by <NL> characters and having versions stored efficiently as deltas (incremental differences) in a single structured data container file, much like an SCCS ".s" file or an RCS ",v" file; compressed_text_file, a variant of text_file that uses standard UNIX data-compression techniques, in addition to using deltas; file, an arbitrary sequence of bytes, each version stored in whole-copy format ("as-is") in a separate file; and compressed_file, a variant of file that uses data compression.

The element types 'file' and 'compress_file' can be used to version-control any UNIX file. For example, executable programs, programming libraries, structured databases (for example, dbm(3) databases), and structured documentation files (for example, bitmap images and desktop-publishing documents). Further, the version-control system does not require that every version of an element contain the same kind of data. For example, version 1 of a file might contain ASCII text, but version 2 might be an equivalent non-text file created by the 'crypt(1)' data-encryption utility. However, such an element must be of type file or compress_file, since not all of its versions fulfill the requirement for the text_file element type.

An element type 'directory' extends the version-control model even further, to the tracking of versions of directories. A directory version does not include the contents of files. Rather, it contains a mapping of names to VOB objects. Each version of a directory element is similar to a standard UNIX directory. That is, it contains (or catalogs) names of file elements and, perhaps, names of other directory elements. Directory versions capture such changes as creation of new files, renaming of files, creation of new subdirectories, and moving of files between directories. Directories can also contain symbolic link and hard link entries. For example, upon accessing a version of a particular file element, '/usr/src/project/usercmds/sort/super.c', the system actually accesses a hierarchy of directory and file versions which could be described as "a version of file super.c, which is cataloged in a version of directory 'sort', which is cataloged in a version of directory 'usercmds', etc.".

Additional element types can also be defined as refinements of the predefined types, using the 'mkeltype' ("make element type") command of the version-control system.

Each file element type has a type manager program associated with it, which handles all elements of that type, for example, storing and retrieving individual versions, comparing versions, and so on. For instance, the type manager for the 'text_file' element type implements the storage-efficacy optimization for text files. Instead of storing each version separately, it computes deltas (incremental differences) between successive versions. All the deltas, and hence all the versions, are stored in a single structured file, the data container. Whenever a program requires the text of a particular version, the type manager reconstructs it on the fly from the data container. Performance can be further optimized by caching recently accessed versions of files in a cache memory.

A view automatically selects a version of each element. In some situations, however, a user may wish to override the view and specify another version of an element, using a version-extended pathname. For example, the pathname 'hello.c@@/main/2' references version 2 on the main branch of element hello.c. The @@ is the extended naming symbol in this case. The extended naming symbol is established at system startup time, and is used to signal the file system that automatic version-selection by the view is not to be performed. This allows a user to specify any object within an element, or the element itself. For example, 'hello.c@@' accesses the element itself; 'hello.c@@/main' accesses a branch of the element's version tree; and 'hello.c@@/main/2' accesses a specific version.

Figure 10:
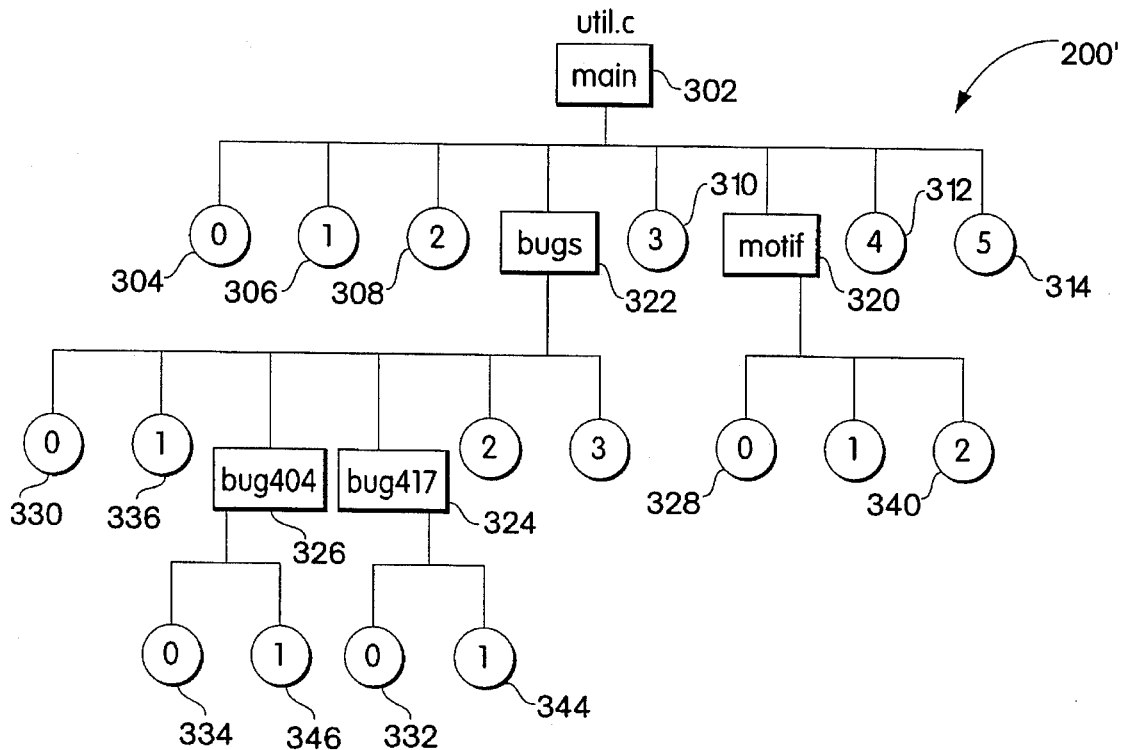
FIG. 10 shows the file tree structure of FIG. 5 implemented as a directory/subdirectory structure by the version control system of this invention.

A version-extended pathname is view-independent. For instance, the string 'hello.cc@@/main/2' identifies a particular version by its version-tree location, regardless of whether that version appears in the current view, or in any view at all. With its hierarchy of branches and subbranches, a version tree has the same structure as a directory tree. For example, the version tree illustrated in FIG. 5 can also be depicted as in FIG. 10.

Using extended naming, a user can navigate a version tree and process its contents using standards UNIX commands, for instance, 'cd', 'ls', 'grep', and so on. This integration of an element's version tree into the UNIX file system expands the version-control system power beyond the one-version-at-a-time capability of views. For example, the following UNIX command searches the 'bugs' branch of element util.c for versions containing the string "impt": 'grep impt util.c@@/main/bugs/*'. Since a user can 'cd' to locations within a version tree, the preceding grep could also be accomplished with this command sequence: 'cd hello.c@@'; 'cd main/bugs'; and 'grep impt'.

In a typical development environment, several views are active on a network at the same time, and on each host, any number of local or remote views can be registered. In addition to version-extended naming, a user can use a view-extended pathname to override their current view and access the version of an element that currently appears in another view. For example, the user might use this command to compare the version of hello.c selected by their view with the one selected by another view: 'diff hello.cv/view/rel3_view/usr/hw/src/hello.c'. Each of these names is dynamic. Just as the version selected by a user's view can change, so can the versions selected by the other views. Version-extended naming allows access to any version of an element, but a user does not always know the version's exact version-tree location. In many situations it is easier, more consistent, and more reliable to reference versions using functional criteria, based on meta-data. For example: "the version that was labeled REL1"; "the most recent version on the motif branch"; "the version created by user drp after last Tuesday"; and "the most recent version on the main branch to which the attribute 'QAed' has been attached with the value Yes".

Figure 11:
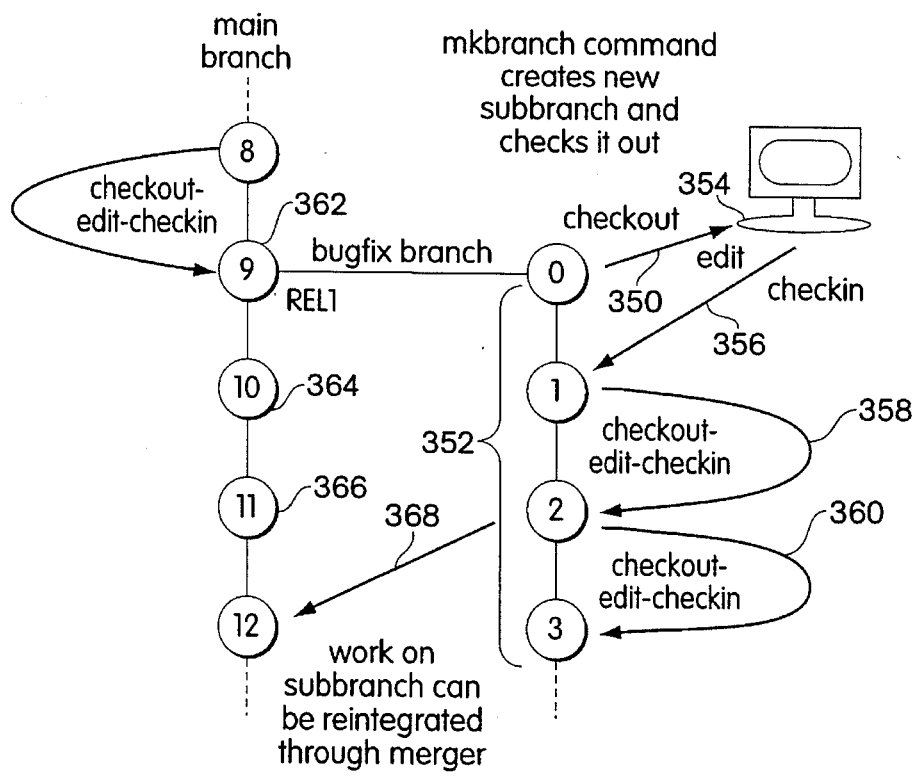
FIG. 11 illustrates the checkout-edit-check-in model of this invention used to manage the growth of an object version tree.

Referring to FIG. 11, the version-control system of this invention uses a "checkout/checkin" model to manage the growth of a file element's version tree. This model works essentially as follows. Before beginning the file is read-only and a user can neither edit it nor remove it. A user issues a 'checkout' command, naming the file. This produces an editable copy of the most recent version of the file. The editable copy appears "in place", under the same pathname as the element. There is no need to copy the file to another location in order to work on it. The user then revises the contents of the file with any text editor. Typically, a user also tests source code changes by compiling, linking, performing test runs, and so on. When the file is correct (or, at least, worth preserving), the user issues a 'checkin' command. This adds a new version to the version tree (the successor to the version that was checked out), and removes the editable copy of the file. The user can specify a comment during the checkin process, to help document the changes made. After checkin of a new version, the file reverts to read-only status.

The checked-in version immediately becomes shared data, available to all users. When a user creates a new version on the main branch, for example, it becomes visible instantly to all users whose views select the most recent version on that branch.

An element's checkouts and checkins are important events in its history. Each time a checkout or checkin occurs, an event record is created and stored in the VOB that contains the element. All users can examine event records at various levels of aggregation, for instance, all events relating to a particular element, all events relating to a particular directory, and so on. The 'lshistory' ("list history") command shows the checkout events and create-version (checkin) event records, including such information as element name, username, date-time, machine, and so on. If the user who performed the checkout or checkin provided a comment, it also appears in this event record.

A checkout event record is deleted from the VOB when the file is checked in. Any user comment associated with the checkout is, by default, placed in the checkin record. Create-version event records are more permanent. They are deleted only if the version itself is subsequently deleted.

The version-control system of this invention also supports parallel development, in which an element evolves simultaneously along several branches, with new versions being added to each branch independently. Parallel development has many uses. It allows different projects, for example, different versions of a product, to use the same source tree(s) at the same time. It isolates the work of developers whose changes should not (yet) be dynamically shared with others. It isolates work that should never be shared with others, for example, a bugfix in a "retired" release. It also prevents roadblocks. For example, development need not cease during a software integration period. Rather, it can proceed on branches, to be reintegrated later.

The 'mkbrtype' ("make branch type") command creates a branch type object in a VOB. This serves to define a branch name for use within that VOB. Thereafter, a user can use the 'mkbranch' ("make branch") command to create a new branch of that type (that is, a branch with that name), "sprouting" it at any existing version. The branch begins with "version 0", which has the same contents as the version at the branch point. There is no copying of data.

As shown in FIG. 11, whenever a user performs a checkout 350 on a branch 352, the system copies the branch's 352 most recent version to a private, editable file 354 in their view. A subsequent checkin command 356 extends that same branch with the user modified version. Subsequent checkout-edit-checkin cycles 358, 360 extend the branch further.

The version control system also has an auto-make-branch version selection rule, which facilitates and enforces the consistent use of branches for a specified task such as bug fixing. Instead of issuing a mkbranch command which automatically performs a checkout, the user does the coverse and issues a checkout command, which automatically performs a mkbranch. Auto-make-branch hides the differences between, for instance, bugfixing work and new development work, since checkout and checkin are the only commands needed to modify sources on branches. A user does not even need to remember the branch name for most purposes, and can "forget" about the special way in which their work is organized, leaving that job to the system.

The need for a new branch arises most frequently when a user must edit an old version. For example, to fix a bug in REL 1, the user might need to modify version 9 of an element 362. In the case where versions 10 and 11 have already been created 364,366, the user cannot simply checkout and edit the old version 9 because the users who created versions 10 and 11 would be surprised to see a version 12 in which none of their work appeared. Further, the user may not be able to use version 11 as the basis of the bugfix because the changes since version 9 may make this file unusable in a bugfix rebuild of Release 1.

To revise the old version 9, the system creates a branch 352 at version 9. This allows the user to perform maintenance work in parallel with ongoing developments on the main branch. At one or more points in the future, the user can merge 368 the maintenance changes back into the main line of development to create version 12.

The user who performs the 'checkout' command is the owner of the checked-out version. Anyone else using the same view sees that checked-out version. Such users may even be able to edit the file depending, in the standard UNIX way, on the owner's 'umask(1)' setting. Users in other views do not see the checked-out version. Rather, they continue to see the version selected by their views' config specs. They can use the 'Ischeckout' command to determine that a checkout has been performed and, if permissions allow, they can use a view-extended pathname to access the checked-out version.

Figure 12:
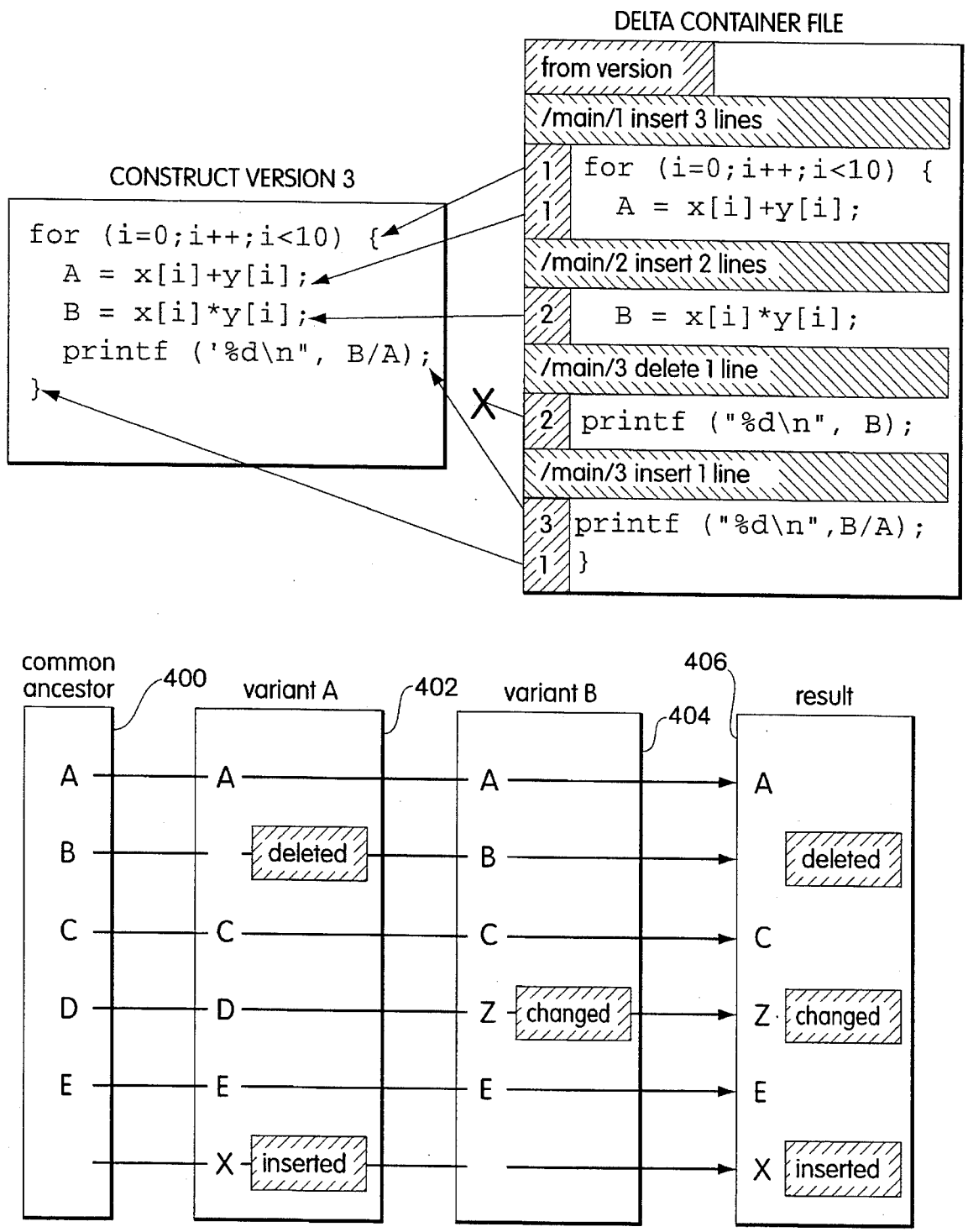
FIG. 12 illustrates the common ancestor based merger operation for combining different versions of object implemented by the version control system of this invention.

FIG. 12 illustrates the common ancestor based merger operation of this invention. Here, a common ancestor 400 is depicted as containing file data elements A, B, C, D, and E. A variant of the common ancestor 400, variant A 402, contains data elements A, C, D, E, and X (inserted) and another variant of the common ancestor, variant B 404, contains data elements A, B, C, Z (changed), and E. The version 406 created as a result of the merger operation is shown to contain data elements A, C, Z, E, and X. The merger rules were applied as follows. Data elements A, C, and E each appear in the result version 406 because they each appear in variants A and B. Element B is deleted from the result version because it has been deleted from one of the variant versions, in this case variant A 402. Data element Z replaces element D in the result version 406 because Z replaced D in one of the variants, in this case variant B 404. Data element Z appears in the result version 406 because it was added to one of the variant versions, in this case variant A 402.

Figure 13:
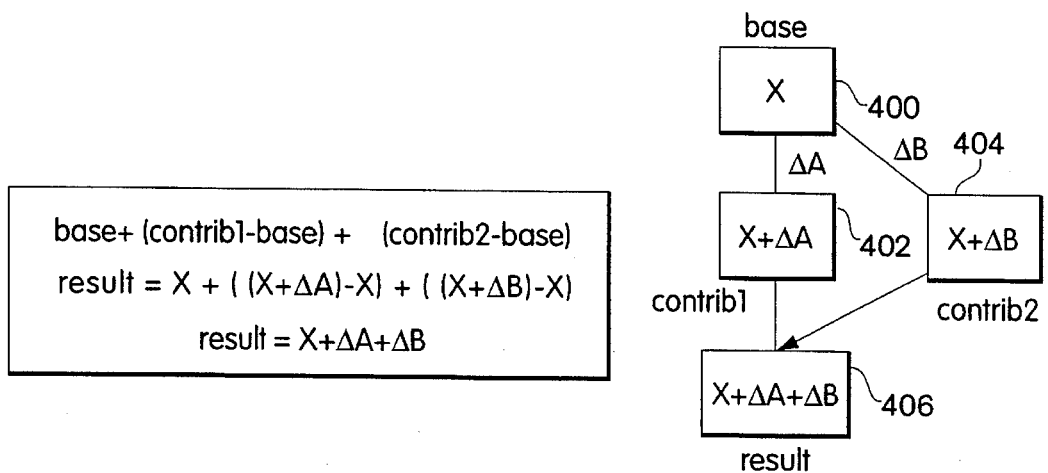
FIG. 13 illustrates a merger operation between two object versions.

FIG. 13 illustrates a simple merger operation between two contributors, variant A 402 (contrib1) and variant B 404 (contrib2) having a common ancestor base 400, as a mathematical operation. Here, the common ancestor base data is represented by X, and the changes to X that result in each of the variants 402 and 404 are represented by $\Delta A$ and $\Delta B$, respectively. Thus, variant A 402 contains $X+\Delta A$ and variant B 404 contains $X+\Delta B$. The resulting version 406 is represented by $X+((X+\Delta A)-X)+((X+\Delta B)-X)=X+\Delta A+\Delta B$.

Only the owner of a checked-out version, along with certain privileged users, can check it in again.

In some version-control systems (for example, SCCS), only one user at a time can reserve the right to create the next version on a branch. In other systems, many users can compete to create the same new version. The version-control system of this invention supports both models by allowing two kinds of checkouts, reserved and unreserved. For instance, only one view at a time can have a reserved checkout of a particular branch. A view with a reserved checkout has the exclusive, guaranteed right to extend the branch with a new version.

After a user performs the checkin, the user no longer has any exclusive rights on that branch. Another user can then perform a reserved checkout to "grab" the right to create the next version on the branch. Many views can have unreserved checkouts of the same branch. Each view gets its own private copy of the most recent version on the branch, and each copy can be be edited independently of all the others. An unreserved checkout does not guarantee, however, the right to create a successor version. If several views have unreserved checkouts of the same branch in different views, the first user to perform a checkin "wins". Another user must perform a merger to incorporate the changes in his or her checked-out version.

A second user can perform an unreserved checkout even if a first user has already performed a reserved checkout of the same version. In this case, the second user cannot perform a checkin until after the first user. Moreover, the second user must perform a merger before performing the checkin, as described below.

Figure 14A:
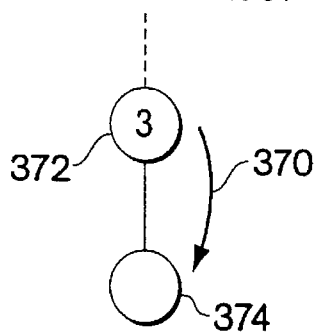
FIGS. 14(a)–14(d) illustrate the combination of the merger operation with reserved and unreserved checkout operations implemented by the version control system of this invention.
Figure 14C:
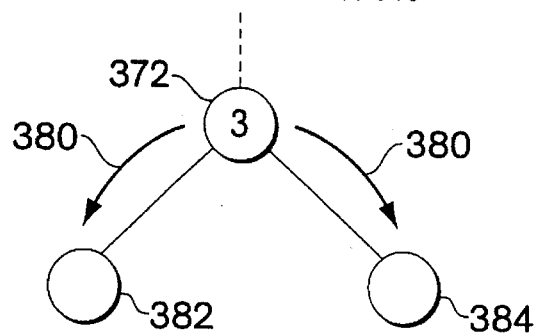
Figure 14B:
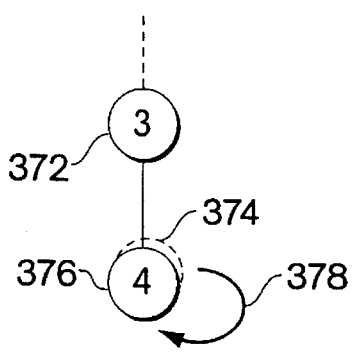

FIGS. 14(a)–14(d) illustrate checked-out versions created by reserved checkouts and by unreserved checkouts, along with the effect of subsequent checkins. As shown in FIG. 14(a), a reserved checkout operation 370 of a version of an element 372 results in the reservation of a checkin spot 374 directly in line with the checked-out version 372. As shown in FIG. 14(b), the version 376 created by a reserved checkout is checked-in 378 into the reserved spot 374. This indicates exclusivity. Because only one version, and no other, has the right to become the successor to the last version in the branch.

Figure 14D:
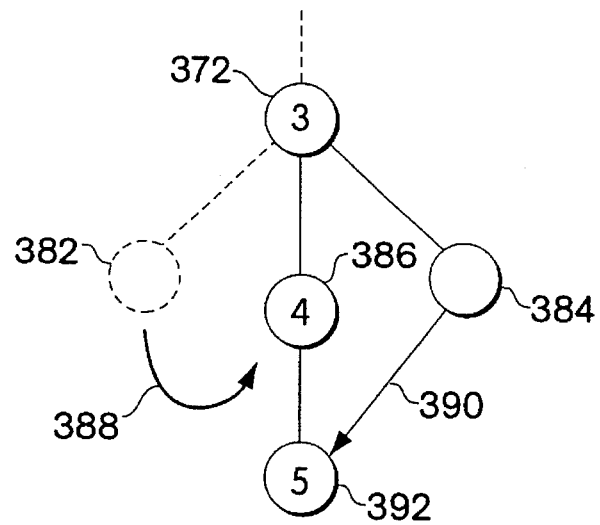

As shown in FIG. 14(c), one or more unreserved checkout operations 380 of a version of an element 372 results in parallel, unreserved workspaces 382, 384 working on the same checked-out version 372. Neither new version 382 or 384 has the exclusive right to become the successor to the last version in the branch 372. As shown in FIG. 14(d), the first new version to be checked-in 388 becomes the successor version 386 to version 372. Any remaining unchecked-in versions, such as version 384 in this example, must be merged, using a merger operation 390, with the last version in the branch 386 to produce a new version 392.

Figure 15:
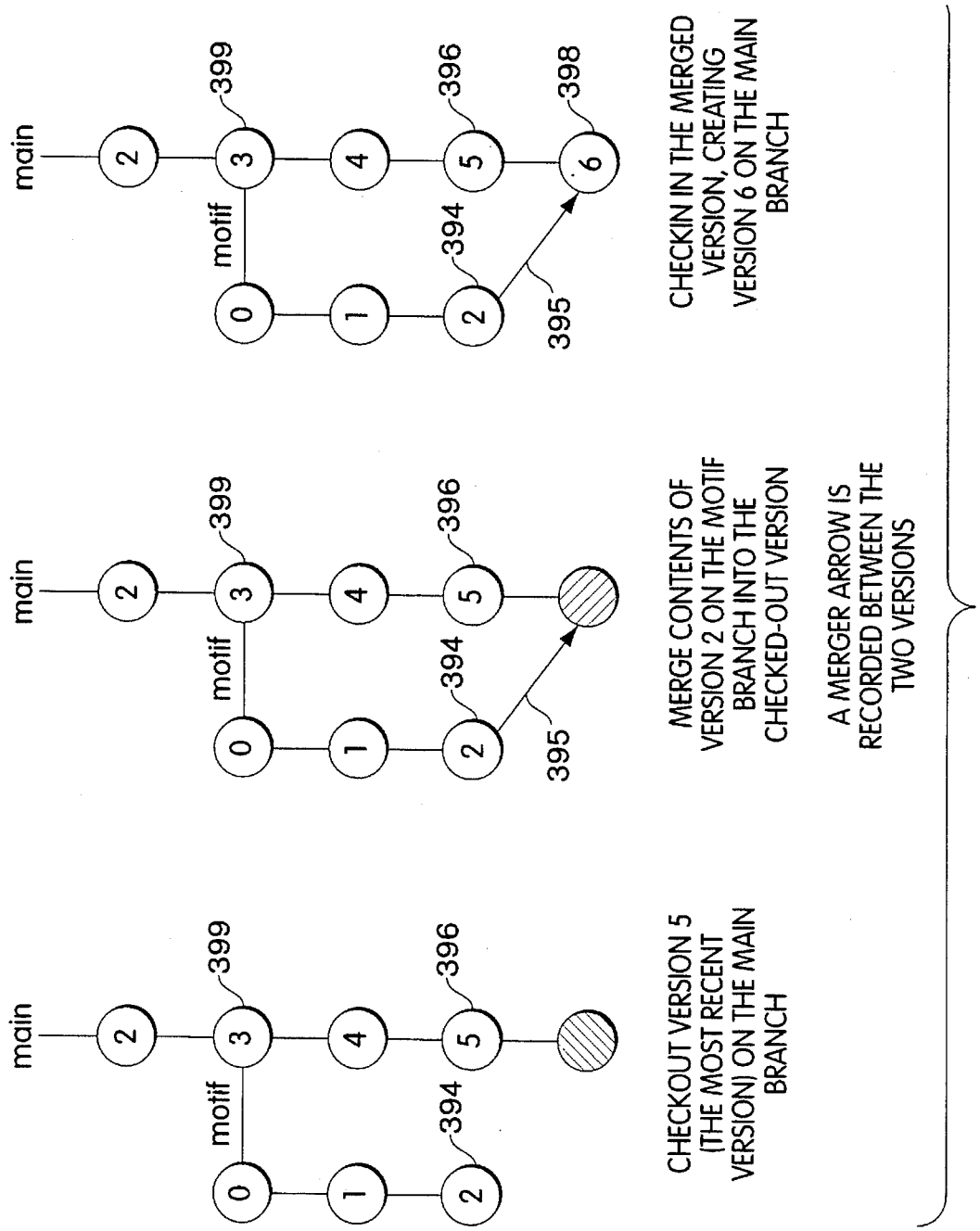
FIG. 15 illustrates a check-in and merger operation between object versions implemented by the version control system of this invention.

Different developers often work on different branches of a version tree. Periodic mergers keep the contents of the branches from diverging too much. As illustrated by FIG. 15, often the contents of the latest version 394 on a subbranch are merged 395 with the contents of the latest version on the main branch 396. Then, the merged contents are checked in as a new version 398 on the main branch.

Mergers take place as automatically as possible. If all the contributors (files used as input to the merger) are versions of the same element, a merger utility automatically determines the base contributor, which is usually the "common ancestor" version. In FIG. 15, the common ancestor is version '/main/3' 399. The merger operation of this invention calculates the changes between the common ancestor version and each of the other contributor versions. If all the changes in the other contributors (in this example,/main/motif/2 394 and the last version on the main branch/main/5 396 are mutually distinct, the merged version is created completely automatically. If a part of the file has been changed in two or more of the other contributors, the merge utility prompts the user to choose which change (or changes) to accept. Mergers in the opposite direction—from the main branch to a subbranch—work in the same way.

In some version-control systems, a merger terminates a development branch. The version control system of this invention allows development to continue after a merger has been performed. Moreover, there is no restriction on future mergers involving these branches, in either direction. If merger arrows indicate that previous mergers have been performed involving the same two branches, the merge utility selects the "tail" of the last merger as the base version.

The merge command can also handle multi-way mergers of up to 32 contributors, producing a single file that combines text from all of them.

Figure 16:
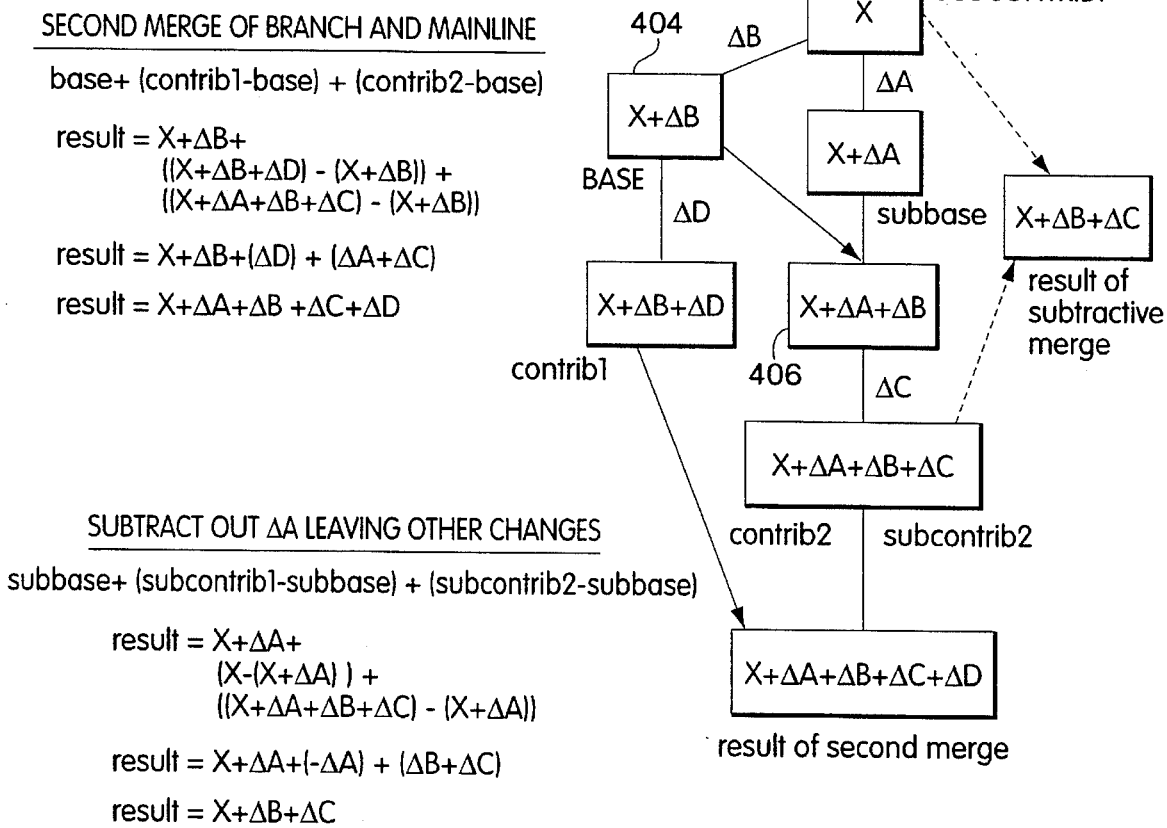
FIG. 16 illustrates a multi-way merger operation and between more than two object versions.

FIG. 16 illustrates a more complex, multi-way merger operation which accomplishes a merger between more than two variant versions using a pairwise difference calculation.

In many situations, a user may simply wish to see the differences between files or versions of an element, without performing a merger. Other utilities perform multiple-file comparisons, using the same pairwise-difference calculation used in mergers.

Source files are the input to the software build process. Equally important are the files that are created by software builds. With the version control system of this invention, such files are called derived objects. Each derived object has two main parts, the data itself and an associated configuration record. The configuration record is a "bill of materials" that stores an audit of the build that produced the derived object. This automatically includes a list of the element versions used in the build. It also includes versions of dependencies (such as build tools) that are explicitly declared in the makefile. Derived objects, like elements, can be accessed either with standard UNIX pathnames or with version extended names.

For a typical source element, there are many versions a user can choose to process. The user can use a standard pathname, in which case the user's view selects a version. Alternatively, the user can use an extended name to access a version selected by another view (for example,/view/gamma/usr/hw/msg.c), or a version that was previously check in to its version tree (for example,/usr/hw/msg.c@@/main/7).

Similarly, it is likely that many derived objects with the same pathname exist at the same time. For example, suppose that source file 'msg.c' is being developed on three branches concurrently, in three different views. Builds performed in those three views produce object modules each named msg.o. Each of these is a derived object, and each has the same pathname, usr/hw/msg.o.

The term "version" is not used here to refer to multiple derived objects with the same pathname. Rather, the term "version" is reserved for objects that live in elements' version trees. Instead, we refer to the several instances of a derived object. The three instances of msg.o can be referred as follows.

Within each view, a standard UNIX pathname can access the derived object built in that view. This is another example of the system's transparency features: 'msg.o' accesses the instance in the current view.

A view-extended name can also be used to access a derived object in another view:/view/beta/usr/hw/msg.o accesses the instance in the specified view. Further, each derived object has a unique derived object ID, which accesses it independently of views: 'msg.o@@11-May.17:38.2668' accesses the instance in view 'alpha'; 'msg.o@@15-May.08:07.3419' accesses the instance in view 'beta'; and 'msg.o@@03-Jun.19:19.7110' accesses the instance in view 'gamma'. A user can create a derived object in a build, then check it in as a version of an element. This is particularly useful in two areas, product release and build hierarchies management. All the derived objects to be included in a product release can be checked in as a version of elements, and all given the same version label (for example, REL4.3). A view that selects only versions labeled REL4.3 is, in essence, a "release area" from which distribution media can be created.

Typically, software systems use a hierarchical build process. For example, executables are built only after programming libraries have been built. With the version control system of this invention, stable versions of libraries and other subtargets can be versions of elements. At build time, the subtarget is simply used essentially as a source file.

Some version-control systems are good at tracking the changes to the contents of files, but have little or no ability to handle changes to the names of files. Name changes are a fact of life in long-lived projects. So are changes like creating new files, deleting obsolete files, moving a file to a different directory, merging sources files together, or completely reorganizing a multi-level directory structure. Users engaged in new development often need to perform such changes in isolation, without affecting others. This is similar to the way changes to files must sometimes be performed in isolation. At other times, users must be able to work in an old directory structure, in order to fix an old release. The version control system of this invention addresses these needs by providing version control of directories, as well as files.

Figure 17:
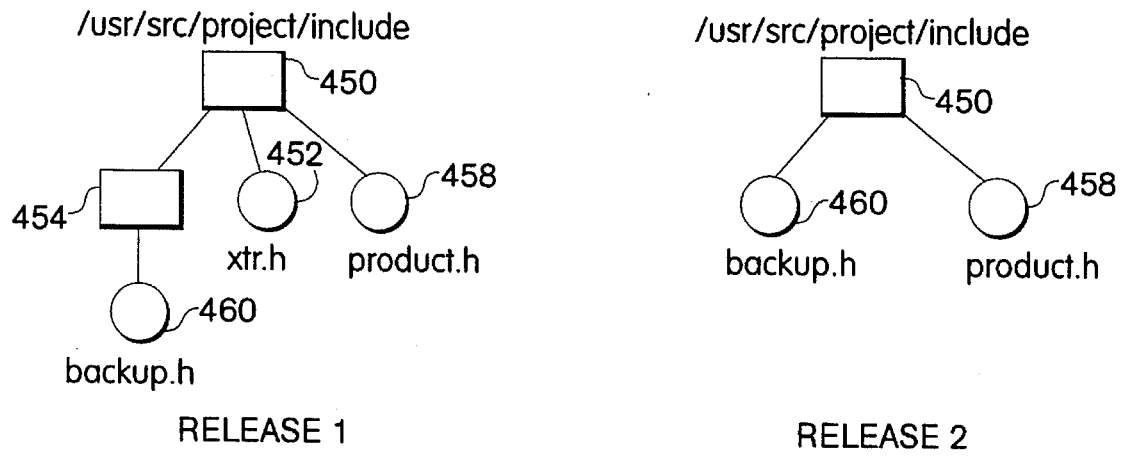
FIGS. 17–19 illustrate the use of versioned directories for cataloging versioned objects implemented by the version control system of this invention.

Consider the scenario illustrated in FIG. 17 In Release 1, a program's sources include a file directory 450 named/usr/src/project/include. Two of the header files are xtr.h 452 and an architecture-specific header file in a subdirectory 454, vega/backup.h 460. In Release 2, xtr.h disappears, having been merged into product.h 458. In addition, backup.h 460 is made generic, and is moved up into usr/src/project/include 450. The vega 454 subdirectory is deleted.

If, for example, however, while the programming staff is in the midst of Release 3 development, an important customer finds a critical bug in Release 1. It is essential to be able to recompile and debug Release 1. Traditional version-control systems have not had a graceful way to deal with the fact that file xtr.h 452 and subdirectory vega 454 no longer exist. Their only recourse has been to replicate the source tree for Release 1. This incurs a disk-space cost, and effectively destroys the relationship between a file in Release 1 and the same file in Release 2.

The version-control system of this invention solves this problem by capturing the source directory structure, and the changes to this structure, as versions of directory elements. Each version of a directory element is analogous to a standard UNIX directory. A UNIX directory is list of names, each of which has a pointer (i-number) to a file system object, a file, directory, and so on. A version of a directory element of this invention is a list of names, each of which has a pointer to another object in the same VOB, a file element, a directory element, or a VOB symbolic link.

In many respect, directory elements resemble file elements. In particular, each view provides transparent access to a selected version of each directory element. Within the context of that view, the directory version behaves like a standard UNIX directory.

Figure 18:
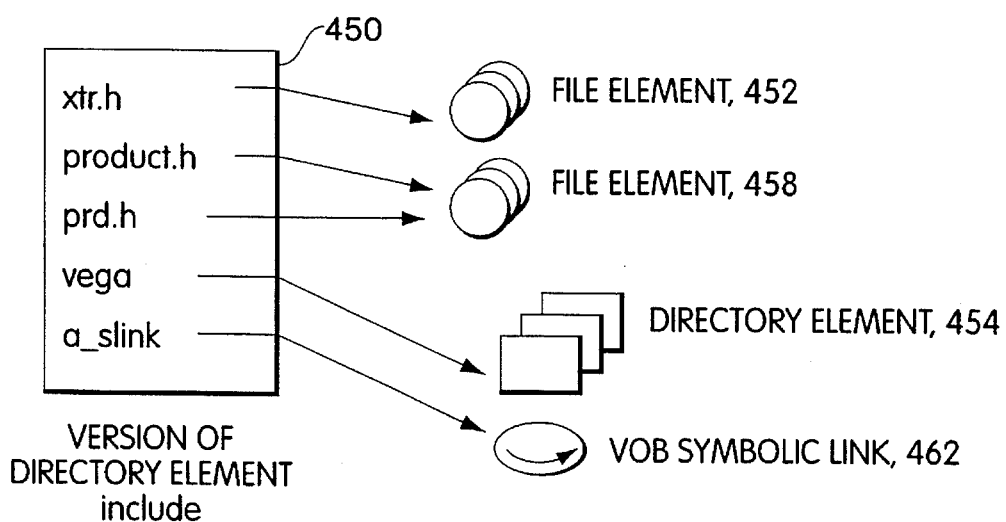

FIG. 18 shows that more than one name can be associated with the same element. In this example, product.h and prd.h both correspond to the same file element 458). Each such association of a name with an element is called a VOB hard link.

A VOB symbolic link 462 is a VOB object, similar to an element. A VOB hard link is not a VOB object, but merely an additional name for an existing object. That is why there is an icon labelled "VOB symbolic link" in FIG. 18, but no icon labeled "VOB hard link".

Figure 19:
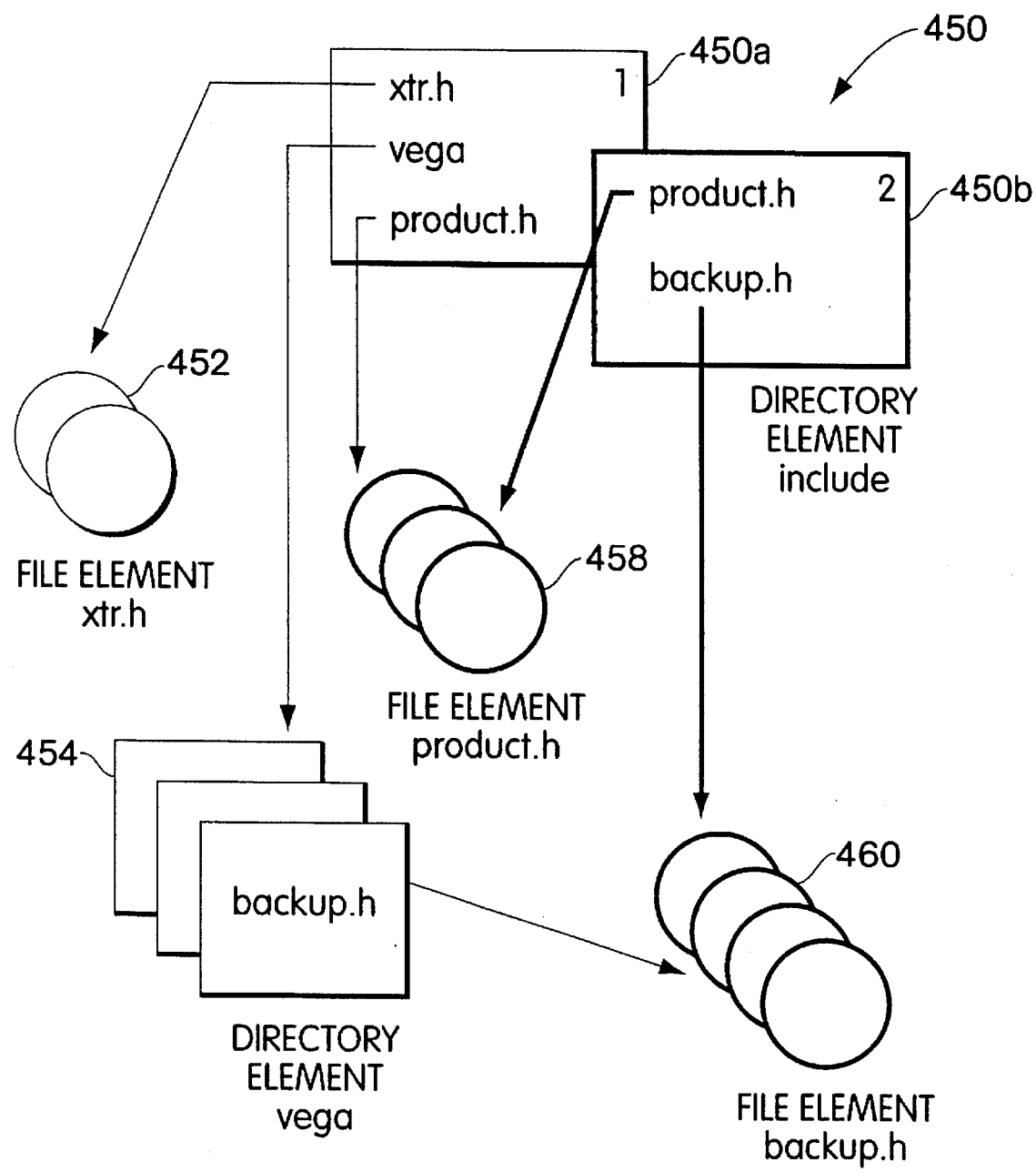

FIG. 19 shows how this invention solves the problems of managing the directory reorganization between Release 1 and Release 2. The "Release 1" directory structure 450(a) was captured as a version of directory element/usr/src/project/include and a version of directory element vega 454, cataloged as a subdirectory of include.

The "Release 2" directory structure 450(b) was captured as another version of the same directory element,/usr/src/project/include. In this version, the directory catalogs a different set of file elements, and it does not catalog any subdirectory element at all.

Thus, a directory version is just a catalog of name which lists the names of other elements, and of VOB symbolic links. The "real data" in Release 1 450(a) is stored in versions of the file elements that are accessed with names xtr.h, product.h, and vega/backup.h. The directory version simply supplies the names of the file and subdirectory elements.

Directory versions are not directly associated with file versions. A directory version catalogs the name of an element, not any particular version of that element. This means that any version of the element is accessible through its name in the directory. For example, when a user fixes a bug, the user typically works with a new version of a file through an old version of a directory. This allows the user easily to determine whether a recent change to the file fixes a bug in an old release.

Directory elements do not contain file elements. For example, the file element named backup.h 460 exists independently of sub-directory vega 454 (in Release 1) and directory include 450(b) (in Release 2). The name "xtr.h" has been removed from Release 2 of directory element include, but the associated file element 452 still exists. It can be accessed through version 1 of include, and perhaps through VOB hard links in versions of other directories, as well.

A user need not checkout a directory in order to checkout the existing elements within it. The evolution of a directory (a list of names) is independent of the evolution of the objects "within" it (the elements to which those names point). A checked-in directory is unmodifiable in the sense that its catalog of names cannot be changed. This does not affect whether the elements associated with those names can be changed. That is determined by the checked-in/checked-out status of the individual elements.

However, modifying a VOB symbolic link changing the name to which the link points can be accomplished only by deleting the old link, and then creating a new one. Thus, a user must checkout a directory before performing such an operation.

Directory elements are modified according to the same checkout/checkin model as file elements. For example, a user may checkout the element, modify the contents of the checked-out version, and checkin the modified version.

The principal difference is in the second step. The contents of a directory differs from the contents of a file. Files are modified with text editors whereas directories are modified with commands like 'rmname' ("remove name of file") and 'mv' ("move or rename file").

The checkout command creates a modifiable version of a directory. This is quite similar to performing checkout of a file, in that the checked-out version of the element is accessible only through a particular view. Other views will continue to see the most recent checked-in version of the directory or some other version, depending on the view's config spec.

Since a directory element is similar to a UNIX directory, the commands that modify a directory element are similar to standard UNIX commands. For example, the 'mkelem' and 'mkdir' commands create new elements within a checked-out directory; the 'ln' ("link") command creates a link within a checked-out directory; the 'rmname' ("remove name") command deletes an element or links from a checked-out directory; and the 'mv' ("move") command renames an element or links within the same directory, or moves it to another directory. In the latter case, both directories must be checked-out and both must be in the same VOB.

As with checkout, the checkin process is analogous for file and directory element. The same process is used (for example, the checkin command) in both cases. This creates a new version on the branch that was checked out. At this point, other views that select the most recent version on that branch will be updated to see the newly checked-in version. The name mechanisms used to access file elements apply to accessing directory elements as well. For example, version-extended naming provides direct access to the different versions of the directory. Different views can select different versions of a directory. A user might use two views to analyze the changes in a directory from Release 1 to Release 2. As with file elements, any kind of meta-data associated with directory elements, their branches, and their versions, can be used as selection criteria.

The system of this invention also has a more general query facility, which locates objects using their meta-data. A user can use queries in many different contexts to locate one or more elements, branches, or versions. A view is typically a query configured in terms of particular branch names and version labels. A quality assurance engineer might use queries to track source versions that have achieved a particular level of coding excellence, as indicated by the value of their CodeQuality attribute. A developer might use a query in coordination with hyperlinks to determine which elements in the current source tree must be kept synchronized with elements in another tree.

Periodically the developer decides to build part or all of a software system under development using the current configuration of sources files (typically, some checked-in, some checked-out), specifying one or more targets, in order to bring them up-to-date with regard to their dependencies. Other files, not explicitly specified as build targets, may also be updated (for example, compiler listing files).

Like the standard UNIX make command, clearmake command of this invention can either reuse an existing target in your view or invoke the corresponding build script. But unlike standard make, clearmake can also "wink-in" an existing target from another view, causing the target to be shared by the views. In builds involving multiple targets (for example, hierarchical builds involving subtargets), clearmake can rebuild some objects, reuse the current instances of others, and wink-in still others.

For example, if a developer builds a program named "hello" using a single source file, hello.c, and makefile, the developer could use standard make to build hello.o, but the files it creates are simply view-private files.

When the developer uses clearmake to perform the build, it creates hello.o as a derived object instead.

The instances of program hello.o created by make and clearmake contain exactly the same data. But the derived object hello.o also has a configuration record associated with it created by a build audit. Such a config rec can appear as follows:

```
% cleartool catcr hello.o
Target hello.o built by akp.user
Host "neptune" running SunOS 4.1.1 (Sun4)
Reference Time 27-May-92.08:03:19,
this audit started 27-May-92.08:03:22
View was neptune:/home/akp/tut/tut.vws
Initial working directory was /tut_vobs/akp_hw/src
    MFS objects:
    /tut_vobs/akp_hw/src/hello.c@@/main/4 <27-May-
92.08:03:07>
    /tut_vobs/akp_hw/src/hello.h@@/main/2 <27-May-
92.08:3:11>
    /tut_vobs/akp_hw/src/hello.o@@27-May.08:03.367
    Build Script:
    cc -c hello.c
```

The 'catcr' ("display config rec") command of this invention can show exactly how this instance of file hello was built. In particular, it shows the version of each source file (and with the—long option, the version of each source directory) that was involved in the building of the derived object file.

Another command of this invention 'diffcr' ("display difference config rec") can compare the configuration records of two or more derived object versions to determine differences in the source object versions used to produce the corresponding derived object versions. In addition, other differences in the build environments used in creating the derived objects can also be displayed and compared.

The derived object hello can be used by clearmake in subsequent rebuilds. A clearmake build of hello in another view can "wink-in" the instance of the derived object just built, and a build in the same view can reuse it. Conversely, executing clearmake hello tomorrow in this view might discard the derived object just built and wink-in an instance of hello another developer built later today in another view (perhaps using a revised source file). Or it might build a new instance of hello.

Derived objects play a critical role in a development environment. From the perspective of standard UNIX tools, a derived object can simply be a file produced by a makefile build script. Typical kinds of derived objects include object modules (.o files created by a compiler or assembler), executable programs (compiled programs or shell scripts), library archives (.a files produced by at(1)), formatted documents (for example, output from troff), and tables of contents generated by a document processing system.

These examples show that a derived object is similar to a makefile target. But there are crucial differences between make targets and clearmake derived objects: A file created by clearmake execution of a build script is a derived object, whether it is an explicit target in a build script, or a sibling file (for example, compiler listing file) created by the build script. Only files whose pathnames are within a VOB are derived objects. Files created in non-VOB directories, such a/tmp, are not derived objects, but merely standard UNIX files.

Figures 20, 21:
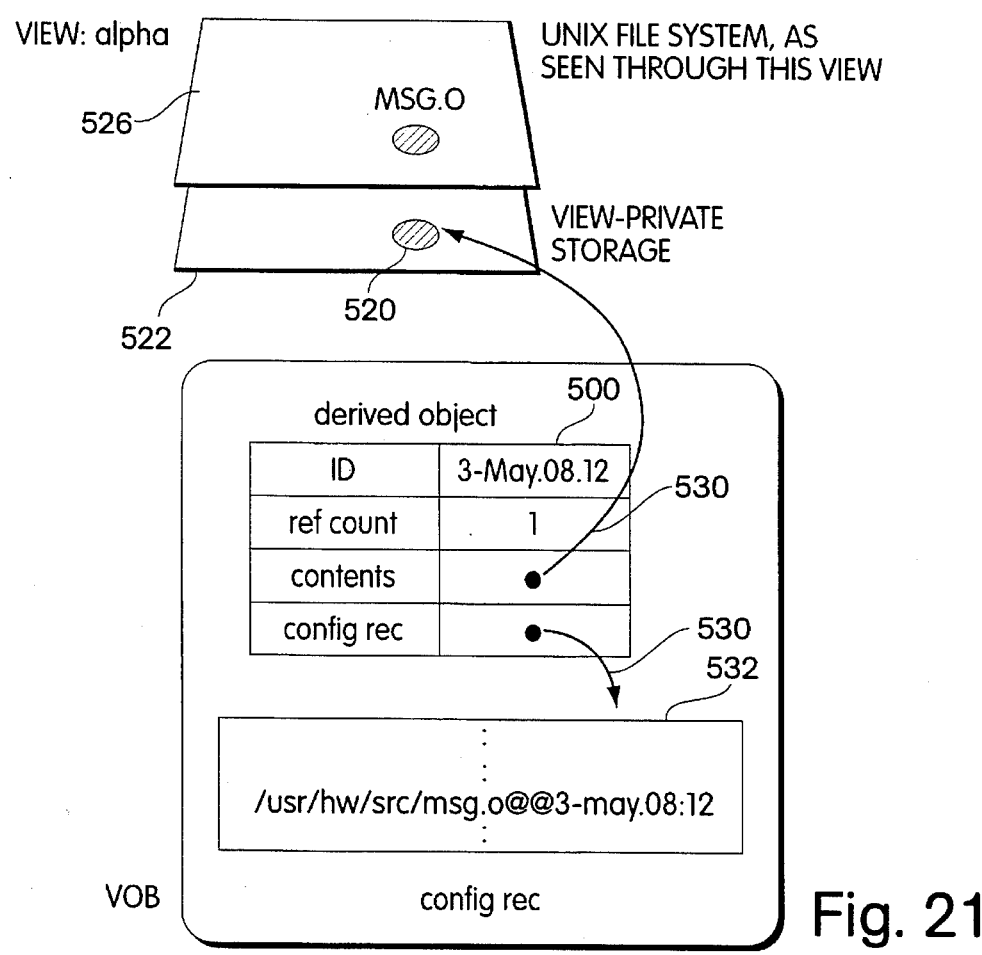
FIG. 20 illustrates the structure of a derived object created by a system build process of the version control system of this invention.
FIGS. 21 and 22 illustrate the creation of derived objects in a view-private storage and the subsequent sharing of those derived objects among other views including moving the derived objects to public storage.

FIG. 20 illustrates the structure of a derived object 500. The components of derived object 500 include the file name 502 under which it was created as a target (or sibling of a target). This is the "handle" of the derived object from the file system's point of view.

Derived object 500 also includes a unique derived object ID 504, which includes the VOB's extended naming symbol (by default, @@) 506, a timestamp 508, and a numeric suffix 510 to guarantee uniqueness. For example: @@07-May.16:09.620. This unique identifier provides a "handle" for the derived object in the VOB database.

The derived object 500 also includes a pointer to the data container 512, the file that stores the data produced by the build script. The data container is identical to the file that would have been created by standard make. The container is initially stored in the view storage area of the view to which the user is set. If a subsequent build causes the derived object to be shared by another view, the data container is promoted to one of the VOB's derived object storage pools.

Derived object 500 further includes a pointer 514 to a configuration record (config rec) 532 which contains the system's audit of the software build process. If a single build script creates multiple derived objects, all these siblings logically share the same config rec. A reference count 516, is also included in the derived object 500 and indicates the number of views in which the derived object currently appears.

In addition to recording the file name of a derived object, the system also keeps track of the directory element in which it was created. Only objects whose pathnames are under a VOB mount point can be derived objects. A clearmake build script can create files outside of any VOB (for example, in/tmp or in your home directory), but such files are standard UNIX objects.

The system of this invention supports parallel development, wherein multiple versions of a software system are created and maintained at the same time. For example, if program hello is under development in three different views, it is likely that each view has its own derived object with file name hello, produced by a recent build.

From the file system's perspective, these derived objects are three like-named files in view-extended namespace. Each view provides access to one instance of the program. For example, their pathnames might be: /view/alpha/usr/hw/src/hello;/view/beta/usr/hw/src hello; and/view/gamma/usr/hw/src/hello. All of the instances of the hello program are simultaneously visible to the lsdo ("list derived objects") command.

To distinguish the multiple instances, the system assigns each one a unique derived object ID 504. All the instances are cataloged in the VOB's database, which is accessible to all views. Thus, a user can enter the lsdo command in any view, even one in which hello has never been built.

Figure 23:
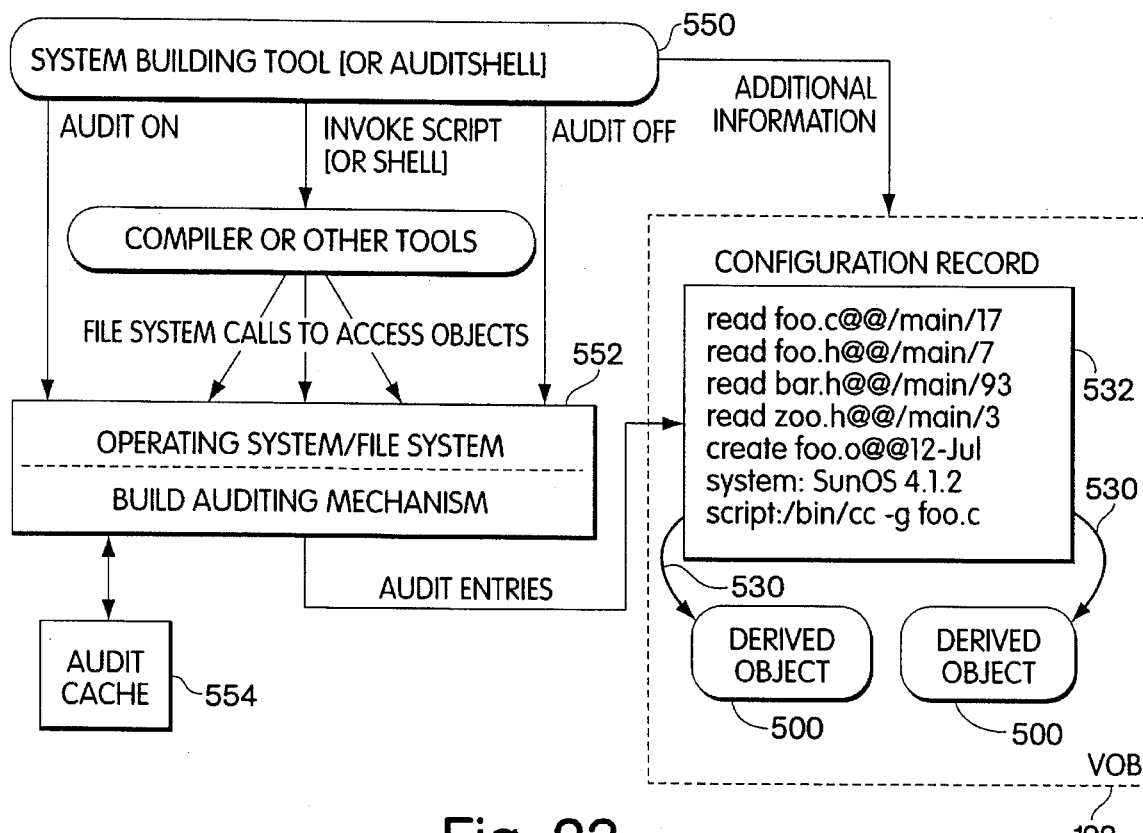
FIG. 23 is a diagram illustrating the version auditor implemented by the version control system of this invention.

Referring to FIG. 23, during execution of a build script 550, an auditor system 552 performs a build audit. The auditor system records, as audit data, the version of every file opened for reading or execution whose pathname is under a VOB mount point, and also notes which files are created or overwritten. After execution of the build script 550 has been completed, the audit data collected by the auditor 552 is stored as a configuration record (config rec) 532 in a VOB database 102. The config rec is attached through a VOB database pointer 530 to each derived object 500 created by the build script 550. A config rec 532 acts as a derived object's "bill of materials", including a wealth of useful information about what the derived object is made of and how it was created. This audit information can include: information on the version of each file element, in any VOB, that was used in the target rebuild; information on each view-private file used in the build; information on each non-MFS file used in the build; the text of the build script; the value of all makefile macros; the ID of each derived object produced by the target rebuild; and general information about the build, i.e., the user who performed the build, the host(s) used to execute the build script, the date and time at which the build started (reference time).

The system auditor 552 can employ an audit cache memory 554 for temporarily storing recently recorded audit records to avoid redundantly recording the identity of object versions in the configuration record 532. This cache is initialized at the start of an audit and invalidated at the end of the audit. The cache is of limited size so some redundant audit records may be produced, but these can be deleted after the audit completes.

It is possible for a single build script to create derived objects in two or more different VOBs. In this case, several config recs are created, one in each of the VOBs involved. This guarantees that the pointer from a derived object to its config rec never crosses a VOB boundary.

The build auditing process distinguishes files whose pathnames fall within a VOB from other files. The terms MFS file and non-MFS file are used to describe this distinction. The system audits these two kinds of files differently. For instance, the system automatically records the versions of all MFS files, noting their unique system internal identifiers. This feature provides the foundation for a sophisticated build-avoidance scheme (configuration lookup), including automatic detection of build dependencies. The system records information only on those non-MFS files that are explicitly declared as dependencies in the makefile. This information includes the time-modified stamp, size, and checksum of the non-MFS file.

Figure 24:
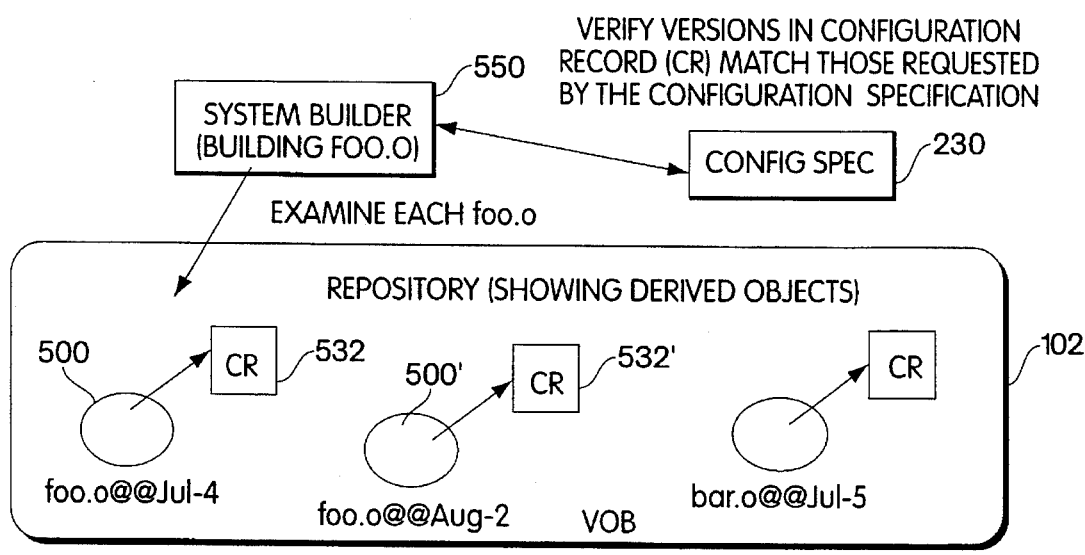
FIG. 24 is a diagram illustrating reusing a previously built version of a derived object by the version control system of this invention.

Referring to FIG. 24, a system build tool 550 can reuse a previously built derived object 500, 500' by determining if the versions of the source objects, which would be selected by the version selector of the current system build using the configuration specification (i.e., the version selection rules) 230, were already used to build any of the previous versions of the derived objects 500, 500', and which are listed in the corresponding configuration records 532,532'.

For example, when the system builder 550 considers building a derived object 'foo.o', it first examines each existing version of the derived object 500, 500' to determine if one of them can be reused. A derived object can be reused if the source object versions reported in the configuration record of that derived object would be selected again by the object version selector being used by the current build. This determination is made by backmatching the source objects in the configuration record against the current object selection rules to see if the resulting source object version that would be selected for the current build is the same version as that listed in the configuration record. In the case where all the source object versions of a previously built derived object match the required source object versions of the current build, the system builder 550 will use the previously built derived object rather than rebuild a new derived object.

The version control system of this invention further takes into account the fact that software builds are not instantaneous. As clearmake build progresses, other developers continue to work on their files, and may check in new versions of elements that another build uses. If a build takes an hour to complete, a developer would not want build scripts executed early in the build to use, for instance, version 6 of a header file, and scripts executed later in the build to use version 7 or 8. To prevent such inconsistencies from occurring, the build utility automatically "locks out" any versions that were checked in after the moment that the build began. This is called the build's reference time.

The coordinated reference time applies to elements only, providing isolation from "after-the-last-minute" changes to them. Users are not, however, protected from changes to view-private and non-MFS objects, since these objects are not versioned. If, for example, a user begins a build and then someone changes a checked-out file used in the build, a failure will result.

In its reference-time handling, the version-control system adjusts for the fact that the system clocks on different hosts in a network are always somewhat out of sync, resulting in "clock skew". As an example, a config spec can include rules that are time-sensitive: time 14-may.01:00; or element */main/LATEST -time yesterday.23:30. Such configuration rules are interpreted with respect to a version's checkin record. The system time on the VOB storage host determines what time is entered into that record. All hosts involved in a build see the same checkin record, but problems can occur if the system clock of the host on which the VOB resides is seriously out of sync with the host controlling the build process.

Referring to FIG. 21, the "data" portion 520 of a derived object 500 is stored in a data container 522, which is very much like a view-private file. Although it appears to be in a VOB directory, the file is physically stored in a users view-private storage area. The system makes no special effort to preserve such view derived objects because they are intended to be short-lived. A user can delete the data container with standard UNIX commands that remove or overwrite files. Likewise, a subsequent build in the same view may overwrite data containers in that view.

Figure 22:
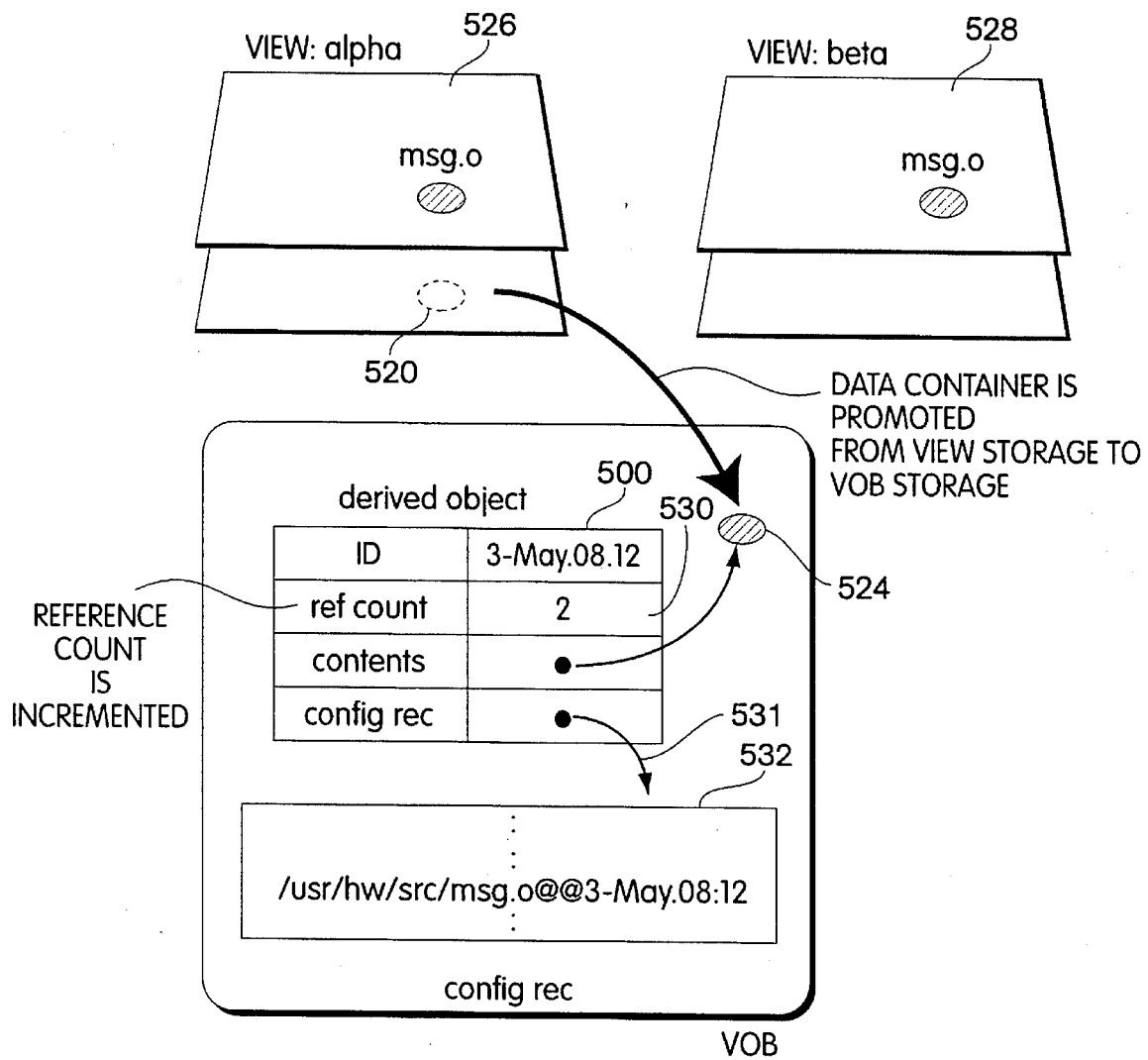

Derived objects are initially created in view storage. Referring to FIG. 22, when a subsequent build causes a derived object to become shared, the data container migrates from view storage 520 to VOB storage 524. This promotion of derived objects accords with the overall system policy of keeping shared objects in shared storage (VOBs), and private objects in private storage (views). Thus, building a large software system might cost a view very little disk space if someone else recently built it using a similar configuration of sources.

Promotion also allows any number of views to share derived objects without having to communicate directly with each other. For example, a view alpha 526 can be "unaware" of another view, beta 528, with which it shares a derived object 500. Beta need not be registered on alpha's host and the hosts involved need not cross-mount each others' file systems.

When the system first creates a derived object, the object's reference count is set to 1 (530, FIG. 21). That is, there is one view, in this case alpha 526,through which the derived object 500 can be accessed through the file system.

Whenever the build utility winks-in a derived object, making it visible through an additional view, in this case beta 528 of FIG. 22, the reference count 530 is incremented. For purposes of reading and execution, each reference to a shared derived object is essentially similar to a UNIX-level hard link where a single object is access by multiple names.

A user can create one or more UNIX hard links to a derived object within a view. Each hard link increments the reference count. When the derived object is winked-in, the additional hard links are also winked-in further incrementing the reference count. When a program running in any of these views overwrites or deletes the derived object, the "link" is broken and the reference count is decremented. This occurs most often when an old derived object is replaced by a new one. With this scheme, each view seems to have private copy of the derived object, but there is no duplication of data thus saving considerable disk space.

It is also quite common for a derived object's reference count to become zero. Suppose a user builds program hello and rebuilds it a few minutes later. The second hello overwrites the first hello, decrementing its reference count. Since the reference count probably was 1 (since the object was just built), it now becomes 0. At this point, the first hello's data container has been deleted, but its config rec remains in the VOB's catalog.

Derived objects are designed for frequent rebuilding and deletion. Standard UNIX commands can delete the data container of an unshared derived object from view-private storage. Similarly, a target rebuild often deletes an existing data container in view-private storage (as a new one is created with the same file name). These commands delete data from view storage only, not from VOB storage. They do not purge an existing derived object from the catalog, and they do not delete data containers of shared derived objects. Thus, such ordinary development work deletes old derived objects from the file system (as it is seen through views), but does not delete derived objects from VOB databases.

A derived object's reference count keeps track of how many views are currently using its data container, and how many additional UNIX hard links to the derived object have been created. A zero reference count means that the derived object has been deleted, overwritten, or rebuilt in every view that ever used it, along with any hard links. This makes the derived object itself a candidate for scrubbing which is automatic physical deletion of the derived object by a scrubber program. If the derived object was ever shared among views, its data container in VOB storage also becomes a candidate for scrubbing.

When a scrubber deletes a derived object that has no siblings, or the last derived object of a set of siblings, the associated config rec 532 is no longer referenced by any derived object. Accordingly, the scrubber deletes the config rec.

A "remove derived object" command operates directly on VOB storage, deleting a derived object and its data container. If there are no surviving siblings, the config rec associated with the derived object is deleted, too.

The system of this invention supports two strategies for turning derived objects into elements while keeping its config. rec. More precisely, different instances of a derived object can be checked in as versions of an element. The schemes can be characterized by the terms "in-place" and "release area". Both of them enable the product of one development effort (for example, a library) to serve as input to another effort (for example, a utility that links with the library). With the "in-place" strategy, the derived object (for example, library libvega.a) is an element in the development directory where it is built (for example, user/src/project/lib). Before starting a build, a user must checkout the element to make it writable. After a "good build", the user checks in a new version of the element libvega.a. Consumers" of libvega.a can select any version of it, just as with any other element. To such users, libvega.a is just a source file element, even though its versions were created by a build script, rather than with a text editor. The idea of maintaining a "development release area" can be generalized to maintaining a "product release area". For example,a Release Engineering group might maintain one or more "release tree" VOBs. The directory structure of the tree(s) mirrors the hierarchy of files to be created on the release medium. Since a release tree involves directory elements, it is easy to change its structure from release to release.

When an executable or other file is ready to be released, a release engineer checks it in as a version of an element in the release tree. An appropriate version label (for example, REL2.4.3) is attached to that version, either manually by the engineer or automatically with a trigger.

When all files to be shipped have been released in this way, a release engineer configures a view to select only versions with that version label. As seen through this view, the release tree contains exactly the set of files to be released.

To cut a release tape, the engineer issues a simple UNIX tar(l) or cpio(1) command to copy the appropriately configured release tree.

The auditor system (FIG. 23) of this invention can also be applied to record a configuration record for any arbitrary set of commands which access versions of objects. In the case of creating a release tape, if the auditor is started prior to issuing the commands to cut the release tape, and stopped after cutting the release tape (i.e., providing an "auditshell" around the commands required to cut the release tape), then the resulting configuration record will contain the identity of the object versions stored to the release tape. This configuration record can later be used as a configuration specification by the version selector of this invention for selecting the correct object versions required to recreate the release tape.

Each source data container holds the contents of one or more versions of a file element. For elements of type text_file, for example, a single source data container holds all the versions. A type manager program for this element type handles the task of reconstructing individual versions from deltas in the data container. Likewise, the type manager updates the data container when a new version is checked in.

Source pools are accessed by checkout and checkin commands, and by development operations (for example, cat(l), lp(1), cc(1)) that read the contents of elements that are not checked-out. In many cases, however, a cache pool will be accessed instead of he source pool. Each cache pool holds the contents of one version of an element. In essence, these pools are caches that accelerate access to elements for which all versions are stored in a single data container: compressed files and text files.

For example, the first time a version of a text_file element is required, a text_file delta type manager reconstructs the version from the element's source data container. The version is cached as a cache pool data container, that is as an ordinary text file located in a cache storage pool. On subsequent accesses, the system looks first in the cache storage pool. A "cache hit" eliminates the need to access a source pool, thus reducing the load on that pool. It also eliminates the need for the type manager to reconstruct the requested version.

Since cache storage pools are periodically "scrubbed", cache hits are not guaranteed. A miss simply means that the type manager must be invoked to reconstruct the version again.

Each derived object data container holds the content (typically, binary data) of a derived object, created during the system build utility during execution. These pools contain only those derived objects that have been shared among two or more views. Derived objects that have never been shared reside in view-private storage.

While this invention has been particularly shown and described with references to a preferred embodiment thereof, it will be understood by those skilled in the art that various changes in form and details may be made therein without departing from the spirit and scope of the invention as defined by the appended claims. For example, although described in terms of a UNIX programming environment, this invention is applicable to a wide variety of operating systems and environments, including for instance the MS-DOS, OS/2 and Microsoft Windows 3.X and MS Windows/NT environments commonly found on IBM compatible personal computers or the MacOS environment or Apple Computers. Furthermore, although specific command language has been described, other command language can also be used to invoke the underlying processes of this invention.

We claim:

1. A data processing system for controlling versions of objects, comprising, a storage device for storing a plurality of versions of a set of objects, a processor for executing instructions and for accessing a subset of the set of objects, which includes retrieving objects from and storing objects to the storage device, during a process, and an auditor for determining the subset of objects accessed by the processor during a process, the auditor auditing the instructions being executed by the processor during the process and recording, as an entry in an audit record, each version of each object within said subset of objects accessed during the process, as said version of said object is being accessed by the processor during the process.

2. The data processing system of claim 1, wherein the process produces derived objects, and the audit record is associated with the produced derived objects.

3. The data processing system of claim 2, wherein the process is a system build.

4. The data processing system of claim 2, wherein the process starts the auditor prior to executing instructions which produce derived objects, and stops the auditor when those instructions are completed.

5. The data processing system of claim 1, wherein the process comprises any arbitrary sequence of instructions.

6. The data processing system of claim 5, wherein the auditor starts before the process is begun and stops after the process is completed.

7. The data processing system of claim 1, wherein the auditor records version information for an accessed data object only once during a process regardless of the number of accesses made to that data object during the process.

8. The data processing system of claim 7, further comprising:

an audit cache memory for storing most recent audit entries to the audit record made by the auditor while producing an audit record for a process.

9. The data processing system of claim 1, further comprising a linker for linking a common identifying label to each object version whose identity is recorded as an entry in an audit record associated with the identifying label.

10. The data processing system of claim 1, further comprising an audit record comparator for comparing audit records to determine the difference between object versions used in building the derived objects associated with the compared audit records.

11. A method for controlling versions of objects, comprising the steps of storing a plurality of versions of one or more objects on a storage device, providing a processor for executing instructions and for accessing a subset of the set of objects, which includes retrieving objects from and storing objects to the storage device during a process, and determining the subset of objects are accessed by the processor during a process, wherein the instructions executed by the processor during the process are audited, and each version of each object within said subset of object accessed during the process is recorded, as an entry in an audit record, as said version of said object is being accessed by the processor during the process.

12. The method of claim 11, further comprising the steps of producing derived objects and an audit record by the process, and associating the produced derived objects with the audit record.

13. The method of claim 12, wherein the process is a system build.

14. The method of claim 12, wherein the recording step comprises starting the recording step prior to executing instructions of the process which produce derived objects, and stopping the auditor when those instructions are completed.

15. The method of claim 11, wherein the process comprises any arbitrary sequence of instructions.

16. The method of claim 15, wherein the recording step comprises starting the recording before the process is begun and stopping the recording after the process is completed.

17. The method of claim 11, wherein the recording step records version information for an accessed data object only once during a process regardless of the number of accesses made to that data object during the process.

18. The method of claim 17, further comprising the step of storing to an audit cache memory most recent audit entries made to the audit record while producing an audit record for a process.

19. The method of claim 11, further comprising the step of linking a common identifying label to each object version whose identity is recorded as an entry in an audit record associated with the identifying label.

20. The method of claim 11, further comprising the step of comparing a plurality of audit records to determine the difference between object versions used in building the derived objects associated with the compared audit records.

* * * * *